United States Patent
Mowatt et al.

(10) Patent No.: US 8,725,650 B2
(45) Date of Patent: May 13, 2014

(54) DOCUMENT TEMPLATE LICENSING

(75) Inventors: David Mowatt, Dublin (IE); Terry Farrell, Dublin (IE)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/358,940

(22) Filed: Jan. 26, 2012

(65) Prior Publication Data

US 2013/0198038 A1 Aug. 1, 2013

(51) Int. Cl.
*G06F 21/10* (2013.01)

(52) U.S. Cl.
USPC .......... 705/59; 705/50; 705/51; 713/193; 726/26; 726/27; 726/30

(58) Field of Classification Search
USPC .......... 705/59, 51; 726/26–30; 713/193
See application file for complete search history.

(56) References Cited

U.S. PATENT DOCUMENTS

| | | | | |
|---|---|---|---|---|
| 1,220,107 | A * | 3/1917 | Hartman | 157/1.26 |
| 5,375,206 | A * | 12/1994 | Hunter et al. | 717/176 |
| 5,438,508 | A * | 8/1995 | Wyman | 705/1.1 |
| 5,752,041 | A * | 5/1998 | Fosdick | 717/178 |
| 5,758,068 | A * | 5/1998 | Brandt et al. | 726/27 |
| 7,380,280 | B2 * | 5/2008 | de Jong | 726/27 |
| 7,480,935 | B2 * | 1/2009 | Bazot et al. | 726/9 |
| 7,716,664 | B2 | 5/2010 | Hughes et al. | |
| 7,739,744 | B2 * | 6/2010 | Burch et al. | 726/26 |
| 7,788,499 | B2 * | 8/2010 | Cameron et al. | 713/185 |
| 7,870,077 | B2 * | 1/2011 | Woo et al. | 705/78 |
| 7,913,312 | B2 * | 3/2011 | de Jong | 726/29 |
| 7,937,458 | B2 | 5/2011 | Nanamura et al. | |
| 7,954,150 | B2 * | 5/2011 | Croft et al. | 726/21 |
| 8,001,612 | B1 * | 8/2011 | Wieder | 726/28 |
| 8,032,601 | B2 * | 10/2011 | O'Donovan | 709/206 |
| 8,171,560 | B2 * | 5/2012 | Reus et al. | 726/26 |
| 8,200,819 | B2 * | 6/2012 | Chung et al. | 709/225 |
| 8,239,770 | B2 * | 8/2012 | Matsuda | 715/738 |
| 8,291,490 | B1 * | 10/2012 | Ahmed et al. | 726/17 |
| 8,327,427 | B2 * | 12/2012 | Soukup et al. | 726/8 |
| 8,327,454 | B2 * | 12/2012 | Jogand-Coulomb et al. | 726/27 |
| 8,333,317 | B2 * | 12/2012 | Buer et al. | 235/380 |

(Continued)

FOREIGN PATENT DOCUMENTS

EP 1287416 B1 6/2007

OTHER PUBLICATIONS

Chong, Frederick, "Application Marketplaces and the Money Trail", Retrieved at: <<http://msdn.microsoft.com/en-us/library/cc325712.aspx>>, Retrieved on: Feb. 14, 2012, pp. 11.

(Continued)

*Primary Examiner* — Mamon Obeid
(74) *Attorney, Agent, or Firm* — Jim Ross; Sade Fashokun; Micky Minhas

(57) ABSTRACT

Methods and systems for licensing a document template are provided herein. The method includes obtaining, within a computing device, a license for a document template from a marketplace service. The method also includes downloading the document template to the computing device. The method includes providing a functional experience of a document derived from the document template to a licensed user. The method further includes sharing a license-restricted document with an unlicensed user in response to an input from the licensed user, wherein the license-restricted document provides a reduced-functionality experience of the document derived from the document template to the unlicensed user.

11 Claims, 14 Drawing Sheets

(56) References Cited

U.S. PATENT DOCUMENTS

| | | | |
|---|---|---|---|
| 8,341,732 B2* | 12/2012 | Croft et al. | 726/21 |
| 8,347,403 B2* | 1/2013 | Rubio | 726/28 |
| 2001/0011254 A1* | 8/2001 | Clark | 705/59 |
| 2002/0087883 A1* | 7/2002 | Wohlgemuth et al. | 713/201 |
| 2002/0091569 A1* | 7/2002 | Kitaura et al. | 705/14 |
| 2002/0091763 A1* | 7/2002 | Shah et al. | 709/203 |
| 2002/0138441 A1* | 9/2002 | Lopatic | 705/59 |
| 2002/0152173 A1* | 10/2002 | Rudd | 705/57 |
| 2003/0076955 A1* | 4/2003 | Alve et al. | 380/201 |
| 2003/0174838 A1* | 9/2003 | Bremer | 380/270 |
| 2003/0182142 A1* | 9/2003 | Valenzuela et al. | 705/1 |
| 2003/0212959 A1* | 11/2003 | Lee et al. | 715/517 |
| 2003/0228842 A1* | 12/2003 | Heinonen et al. | 455/41.2 |
| 2003/0229900 A1* | 12/2003 | Reisman | 725/87 |
| 2004/0049392 A1* | 3/2004 | Yamada | 704/273 |
| 2004/0049482 A1* | 3/2004 | Brechter et al. | 707/1 |
| 2004/0083391 A1* | 4/2004 | De Jong | 713/201 |
| 2004/0088176 A1* | 5/2004 | Rajamani | 705/1 |
| 2004/0148229 A1 | 7/2004 | Maxwell | |
| 2004/0192440 A1 | 9/2004 | Evans et al. | |
| 2004/0199514 A1* | 10/2004 | Rosenblatt et al. | 707/10 |
| 2004/0249768 A1* | 12/2004 | Kontio et al. | 705/65 |
| 2004/0268137 A1* | 12/2004 | Kouznetsov et al. | 713/193 |
| 2005/0071280 A1* | 3/2005 | Irwin et al. | 705/59 |
| 2005/0091173 A1* | 4/2005 | Alve | 705/71 |
| 2005/0138110 A1* | 6/2005 | Redlich et al. | 709/201 |
| 2005/0240927 A1 | 10/2005 | Hintermeister | |
| 2006/0053080 A1* | 3/2006 | Edmonson et al. | 705/59 |
| 2006/0059481 A1 | 3/2006 | Smith et al. | |
| 2006/0080316 A1* | 4/2006 | Gilmore et al. | 707/9 |
| 2006/0271425 A1* | 11/2006 | Goodman et al. | 705/14 |
| 2007/0067851 A1* | 3/2007 | Fernando et al. | 726/26 |
| 2007/0079381 A1* | 4/2007 | Hartung et al. | 726/26 |
| 2007/0094737 A1* | 4/2007 | Larsson et al. | 726/26 |
| 2007/0112676 A1* | 5/2007 | Kontio et al. | 705/50 |
| 2007/0112935 A1* | 5/2007 | Espelien | 709/217 |
| 2007/0150607 A1* | 6/2007 | Flinchem et al. | 709/228 |
| 2007/0174205 A1 | 7/2007 | Saito | |
| 2007/0192252 A1* | 8/2007 | Shear et al. | 705/51 |
| 2007/0207780 A1* | 9/2007 | McLean | 455/414.1 |
| 2007/0226805 A1* | 9/2007 | Jeal et al. | 726/27 |
| 2007/0255580 A1* | 11/2007 | Cole et al. | 705/1 |
| 2007/0261105 A1* | 11/2007 | Drath et al. | 726/4 |
| 2007/0265932 A1* | 11/2007 | Im et al. | 705/26 |
| 2007/0265977 A1* | 11/2007 | Read | 705/59 |
| 2007/0283447 A1* | 12/2007 | Hong et al. | 726/28 |
| 2007/0299976 A1* | 12/2007 | Zafar et al. | 709/229 |
| 2008/0034412 A1* | 2/2008 | Wahl | 726/8 |
| 2008/0060043 A1* | 3/2008 | Malik | 725/134 |
| 2008/0083025 A1 | 4/2008 | Meijer et al. | |
| 2008/0189294 A1* | 8/2008 | Cha | 707/10 |
| 2008/0215468 A1 | 9/2008 | Monsa-Chermon et al. | |
| 2008/0235142 A1* | 9/2008 | Gonze et al. | 705/59 |
| 2008/0250328 A1* | 10/2008 | Konttinen | 715/747 |
| 2008/0320599 A1* | 12/2008 | Raley et al. | 726/26 |
| 2009/0043678 A1* | 2/2009 | Bizri | 705/30 |
| 2009/0055377 A1* | 2/2009 | Hedge et al. | 707/5 |
| 2009/0210315 A1* | 8/2009 | Jean et al. | 705/26 |
| 2009/0248524 A1* | 10/2009 | Defoy et al. | 705/14.1 |
| 2010/0293622 A1* | 11/2010 | Nikitin et al. | 726/31 |
| 2011/0105150 A1 | 5/2011 | Moon et al. | |
| 2011/0126274 A1* | 5/2011 | Sadeckas | 726/7 |
| 2011/0173337 A1* | 7/2011 | Walsh et al. | 709/229 |
| 2012/0209915 A1* | 8/2012 | Lee et al. | 709/204 |
| 2012/0221466 A1* | 8/2012 | Look | 705/39 |
| 2013/0110565 A1* | 5/2013 | Means et al. | 705/7.11 |
| 2013/0159840 A1* | 6/2013 | Nicolaescu | 715/235 |
| 2013/0212704 A1* | 8/2013 | Shablygin et al. | 726/28 |

OTHER PUBLICATIONS

Chong, Frederick, "Preview of S+S Application Marketplace Architecture Guidance", Retrieved at <<http://msdn.microsoft.com/en-us/library/cc411321.aspx>>, Retrieved on: Feb. 14, 2012, pp. 13.

Indiana University, "In Internet Explorer, What Are Third-Party Browser Extensions, and How Do I Disable Them?", Available at: <<http://kb.iu.edu/data/auno.html>>, Retrieved Date: Feb. 14, 2012, pp. 1.

Jajodia, Saket, "How to Embed Fonts in Microsoft Office Documents", Aug. 17, 2011, Retrieved at <<http://jajodia-saket.sjbn.co/2011/08/how-to-embed-fonts-in-microsoft-office-documents/>>, Retreived Date: Aug. 26, 2011, pp. 2.

Microsoft, "An Introduction to Excel Services", Available at: <http://msdn.microsoft.com/en-us/library/bb758869%28v=office.12%29.aspx>, Retrieved Date: Sep. 2, 2011, pp. 28.

Microsoft, "Licensing Details", Available at: <http://sharepoint.microsoft.com/en-us/buy/Pages/Licensing-Details.aspx> Retrieved on: Sep. 2, 2011, pp. 5.

Microsoft, "Office Web Apps Overview (Installed on SharePoint 2010 Products)", Avaliable at: <<http://technet.microsoft.com/en-us/library/ff431685.aspx>>, Retrieved on: May 12, 2010, 7 pages.

Microsoft, "Setting Up Development Environments for the 2007 Microsoft Office System", Retrieved at <<http://msdn.microsoft.com/en-us/library/bb330848.aspx>>, Retrieved Date: Aug. 29, 2011, pp. 27.

Microsoft, "Understanding Office 2007 Development", Retrieved at <<http://msdn.microsoft.com/en-us/office/aa905371.aspx>>, Retrieved Date: Aug. 29, 2011, pp. 5.

Microsoft, "Windows Marketplace Help", Retrieved at <<http://www.windowshelp.net/windows-marketplace-help/digital-locker.aspx>>, Retrieved on: Feb. 12, 2011, pp. 3.

Mosher, Barb, "Sharevolution Offers a New Marketplace for SharePoint Online", Retrieved at: <<http://www.cmswire.com/cms/enterprise-collaboration/sharevolution-offers-a-new-marketplace-for-sharepoint-online-011508.php>>, Retrieved on: Feb. 14, 2012, pp. 5.

"International Search Report", Mailed Date: May 9, 2013, Application No. PCT/US2013/022436, Filed Date: Jan. 22, 2013, pp. 9. English.

* cited by examiner

400

DOCUMENT TEMPLATE LICENSING

BACKGROUND

Companies that distribute documents have limited opportunities to protect the content that they are selling from being reused by unlicensed users. As used herein, the term "documents" may refer to files that include content surrounded by metadata. The challenge that these companies face is that they rarely sell the final form of a document. Instead, these companies typically sell document templates. These document templates, e.g., templates for legal documents, presentations, or brochures, among others, enable the users who buy them to achieve a higher quality of document. However, these document templates are typically further customized by the end user. Thus, because the user is allowed to edit the document, the user can also use features, such as, for example, copy and paste features, to reuse components of the document template in other documents.

For certain types of documents that are used in a business context, e.g., business plans or project reports, licensing enforcement is a challenge. This challenge results from the fact that there is a strong expectation that peers or customers of the purchaser should be allowed to edit the document as well. Thus, the electronic document should be flexible enough to be edited by multiple people, while still preventing mass, unlicensed reuse of the original document template.

Companies who sell document templates typically use legal restrictions to enforce licensing. The document template, once sold, is electronically unrestricted, but the user often signs a license agreement stating that they will not share the document template with others.

In addition, some companies use digital rights management (DRM) to encrypt documents containing the document templates, and to force the user to sign-in before they can edit, or possibly even view, the documents. This solution is particularly cumbersome, since the DRM technology may be time-consuming and costly. Moreover, if the document is to be shared with other users beyond the purchaser, there may be a burdensome sign-up step for each new user who desires access. Furthermore, the application which renders this document may have to employ some kind of screen capture blocking software to ensure that imagery, which the provider would wish to protect from unlicensed usage, was not simply screen-grabbed.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

An embodiment provides a method for licensing a document template. The method includes obtaining, within a computing device, a license for a document template from a marketplace service. The method also includes downloading the document template to the computing device. The method includes providing a functional experience of a document derived from the document template to a licensed user. The method further includes sharing a license-restricted document with an unlicensed user in response to an input from the licensed user, wherein the license-restricted document provides a reduced-functionality experience of the document derived from the document template to the unlicensed user.

Another embodiment provides a system for licensing a document template. The system includes a computing device configured to obtain an entitlement for a document template in response to an input from a licensed user. The computing device is also configured to provide a rich experience of a document derived from the document template to the licensed user, wherein the rich experience includes a quality and a functionality of the document that are in accordance with the entitlement. The computing device is further configured to enable the licensed user to share a reduced-functionality experience of the document derived from the document template with an unauthorized user, wherein sharing the reduced-functionality experience of the document includes sharing a license-restricted document.

Another embodiment provides one or more non-transitory, computer-readable storage media for storing computer-readable instructions. The computer-readable instructions provide a document template licensing system when executed by one or more processing devices. The computer-readable instructions include code configured to acquire a document template in response to an input by a user and determine if the user has an entitlement for the document template. The computer-readable instructions also include code configured to provide the user with access to a functional experience of a document derived from the document template in accordance with conditions of the entitlement in response to determining that the user has the entitlement for the document template. Further, the computer-readable instructions include code configured to provide the user with access to a restricted experience of the document derived from the document template in response to determining that the user does not have the entitlement for the document template.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
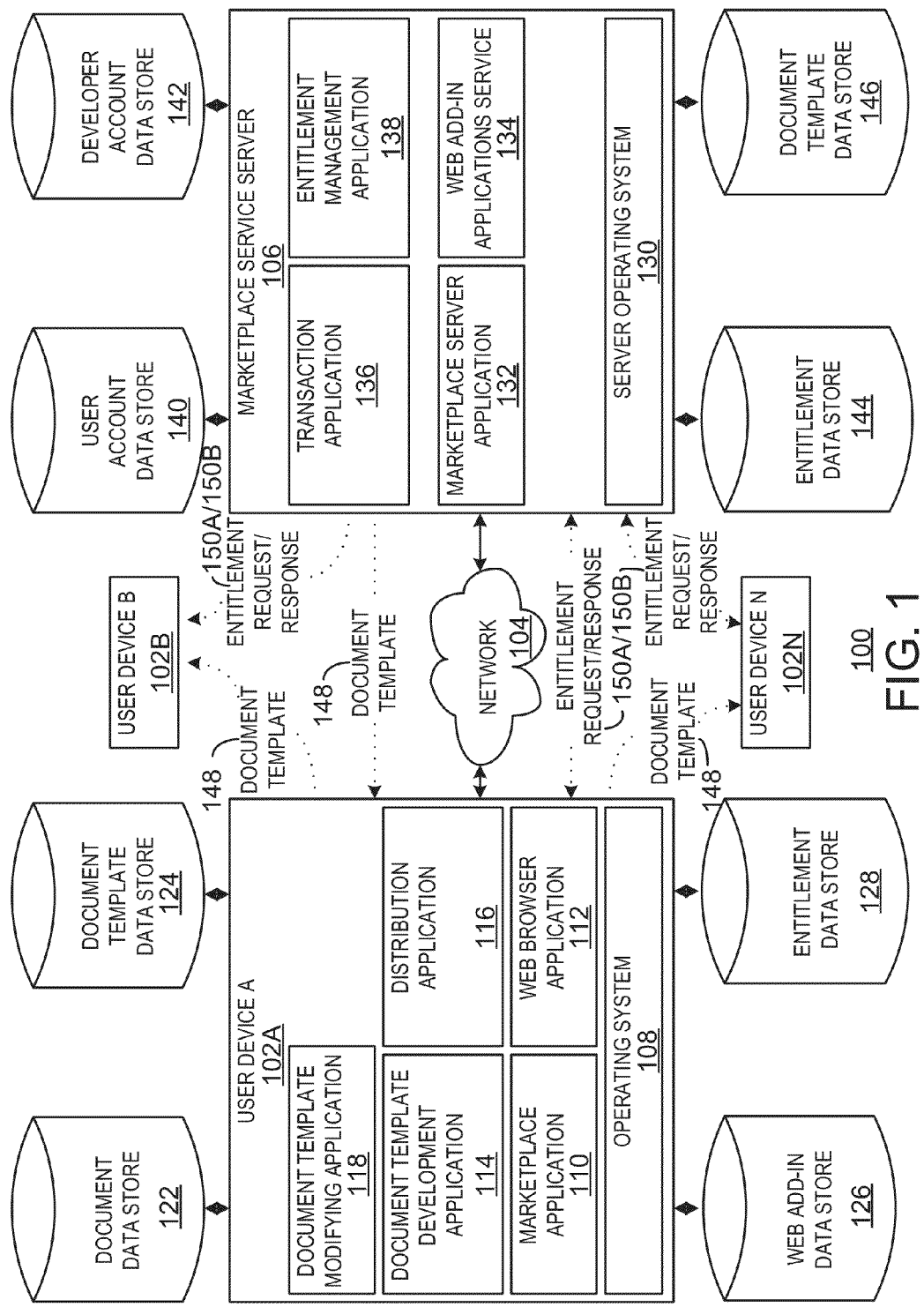
FIG. 1 is a block diagram of an operating environment in which the document template licensing procedure disclosed herein may be implemented.

The same numbers are used throughout the disclosure and figures to reference like components and features. Numbers in the 100 series refer to features originally found in FIG. 1, numbers in the 200 series refer to features originally found in FIG. 2, numbers in the 300 series refer to features originally found in FIG. 3, and so on.

DETAILED DESCRIPTION

Embodiments disclosed herein set forth a method and system for licensing document templates, as well as enforcing the licenses for the document templates. As used herein, the term "document template" refers to a style guide for a document. For instance, a word processing document template can include, but is not limited to including, formatting, styles, boilerplate text, headers, footers, macros, dictionaries, toolbars, or auto text entries, among others. Such document templates may be used for facilitating the creation of documents such as, but not limited to, word processing documents, spreadsheet documents, presentation documents, drawings documents, and collaboration documents. In addition, the document templates may have one or more web-based software application extensions embedded within or attached thereto.

According to embodiments disclosed herein, web-based software application extensions may be referred to as "web add-ins." A web add-in provides a region containing a web page within an application. The web add-in provides new and interactive content types and functionalities. Like web pages, web add-ins can be built using standard web technologies such as, but not limited to, hypertext markup language ("HTML"), JavaScript, representational state transfer ("REST"). In contrast to existing extensibility technologies like add-ins and visual basic for applications ("VBA"), web add-ins enable a single codebase to run on multiple environments, including rich client applications, mobile phone applications, tablet applications, and applications configured to run on various personal computer ("PC") operating systems, such as MICROSOFT WINDOWS, available from Microsoft Corporation of Redmond, Wash. Web add-ins can be acquired by end users from a virtual marketplace service or from collaboration platform websites, such as websites developed using MICROSOFT SHAREPOINT, available from Microsoft Corporation of Redmond, Wash., in the form of stand-alone extensions or subcomponents of document template solutions or applications.

Web add-ins can be configured to do or provide anything a web page or web service can do or provide. For instance, web add-ins can provide an interactive user interface ("UI"), custom logic through dynamic HTML ("DHTML") or JavaScript, leverage JavaScript frameworks like JQuery, or connect to REST/web services via HTTP/AJAX. Web add-ins can also host controls provided in ADOBE FLASH, available from Adobe Systems of San Jose, Calif., MICROSOFT SILVERLIGHT, available from Microsoft Corporation of Redmond, Wash., or other application frameworks for developing rich web-based applications and content. In addition to providing the functionality of a web page within a document, web add-ins can interact with a hosting application through a JavaScript library that provides application programming interfaces ("APIs") for reading and writing to documents as well as handling key application and user events like selection change.

In some embodiments, a web add-in has a reference to and a description of a web server that is capable of providing a web page or web service. The reference to and description of the web server is referred to herein as a web add-in manifest, or simply a manifest. The web page or web service can be connected to a document or an application through a web add-in.

A virtual marketplace service is provided that facilitates users to browse, search, and choose from available manifests. The marketplace service may also enable users to browse, search for, and choose from available document templates, which may include any number of web add-ins. In some embodiments, a user may search for a specific document template, and then determine desired web add-in manifests to be used in conjunction with the document template. In other embodiments, a user may search for a particular web add-in manifest and, in the process, may locate a document template that contains the web add-in in the desired form.

One or more web servers are also provided for powering web add-ins that are located within, or bound to, document templates. In some embodiments, the web servers are hosts to download files, such as HTML or JavaScript files. In some embodiments, the web servers provide a set of web services that connect to a rich back-end that includes server-side logic.

For ease of illustration and description, a web add-in is used herein, at times, to collectively refer to a manifest and the ability for a web server to provide one or more of the following: (1) one or more HTML files; (2) one or more JavaScript files; and (3) one or more web services to access server-side functionality and content that add value to a document or application.

In some embodiments, users that own document templates including web add-ins, or have trial access to such document templates, can use the document templates to create documents, or can insert the web add-ins into documents. In some embodiments, any user can utilize a document template, but may only be provided with a restricted, or reduced-functionality, experience of the document template. For example, the user may be forced to view some form of advertising within a document derived from the document template, may be able to insert watermarked images only within the document, or may be able to invoke functionality to perform calculations on limited data sets within the document. Trials in this instance could be used to provide a time-limited free way to access the full functionality of the document derived from the document template. Further, in some embodiments, certain document templates are offered free of charge. In any case, the users can then distribute the document templates containing the web add-ins, or documents derived from such document templates, to other users, who may or may not be licensed, if applicable, to use the document templates. The document templates, or documents derived from the document templates, may be distributed in any way that files are distributed. When a user receives a document template containing a web add-in, the user can obtain trial rights to the document template or purchase the document template without having to visit a marketplace service. Once a user has purchased an entitlement, or license, for a document template, the document template, as well as the web add-ins within the document template, may become fully functional, or may function to the extent that is guaranteed by the particular license.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory, computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

FIG. 1 is a block diagram of an operating environment 100 in which the document template licensing procedure disclosed herein may be implemented. The operating environment 100 shown in FIG. 1 includes a user device A 102A operating on or in communication with a network 104. The user device A 102A may be a personal computer ("PC"), desktop workstation, laptop computer, tablet computer, notebook computer, personal digital assistant ("PDA"), electronic-book reader, game console, set-top box, consumer electronics device, server computer, or any other type of computing device configured to perform the various operations described herein for licensing document templates and enabling the usage of such document templates in accordance with the conditions set forth in the document template licenses. The network 104 may be the Internet, an intranet, or an extranet. Access to the network 104 may be provided via one or more wired or wireless access networks (not shown), as will be understood by those skilled in the art.

The user device A 102A is configured to communicate with a marketplace service server 106 to obtain document templates for one or more applications that execute on the user device A 102A, as will be described in greater detail herein. The user device A 102A is also configured to distribute one or more document templates to one or more other user devices, which, in the illustrated embodiment, include a user device B 102B and a user device N 102N. The user device A 102A may additionally or alternatively obtain web add-ins for one or more applications from the user device B 102B or the user device N 102N. The user device B 102B and the user device N 102N may be personal computers ("PCs"), desktop workstations, laptop computers, tablet computers, notebook computers, personal digital assistants ("PDAs"), electronic-book readers, game consoles, set-top boxes, consumer electronics devices, server computers, or any other type of computing devices configured to perform the various operations described herein.

The user device A 102A is configured to execute an operating system 108 and one or more application programs such as, in the illustrated embodiment, a marketplace application 110, a web browser application 112, a document template development application 114, a distribution application 116, a document template modifying application 118, and one or more other applications (not shown). In various embodiments, the document template modifying application 118 may be configured to incorporate document templates including web add-ins into documents. In some embodiments, two or more of the above applications 110, 112, 114, 116, and 118 are combined in a single application program. In some embodiments, the document template modifying application 118 includes one or more features provided by the marketplace application 110, the web browser application 112, the document template development application 114, or the distribution application 116. The operating system 108 is a computer program for controlling the operation of the user device A 102A. The application programs are executable programs configured to execute on top of the operating system 108 to provide various functionalities described herein.

Although the applications 110, 114, 116, and 118 are illustrated as being hosted on the user device A 102A, one or more of these applications may be implemented as one or more websites or one or more web pages within one or more websites that are operating on the World Wide Web ("the Web"). In some embodiments, one or more of these applications is implemented on the marketplace service server 106 or one or more other servers, which are accessible by the user device A 102A via the web browser application 112. Moreover, although the user device A 102A is illustrated as including the applications 110, 112, 114, 116, and 118, in some implementations, the user device A 102A includes one or more of these applications, but not all of these applications as in the illustrated embodiment. Accordingly, the illustrated embodiment should not be interpreted as being limited to a device that necessarily includes all of the illustrated applications 110, 112, 114, 116, and 118.

The marketplace application 110 is an application program through which a user can access a virtual marketplace service to obtain marketplace content, such as applications and document templates including web add-ins, which are hosted by the marketplace service server 106. The marketplace application 110, in some embodiments, is a marketplace client application installed on the user device A 102A that provides a graphical user interface ("GUI") through which a user can browse marketplace content, search for marketplace content, download marketplace content, manage marketplace content, create and manage user accounts, read reviews on marketplace content, and otherwise interact with the marketplace service server 106. Although the marketplace application 110 is illustrated as residing on the user device A 102A with the applications 112, 114, 116, and 118, it should be understood that, in some implementations, the user device A 102A includes only the marketplace application 110 or the marketplace application 110 and one or more of the applications 112, 114, 116, and 118, but not all of these applications.

The web browser application 112 is an application program through which a user can access information resources on the web via the network 104. In some embodiments, the web browser application 112 allows a user to access a marketplace website hosted by or for the marketplace service server 106. The marketplace website may provide a web-based GUI through which a user can browse marketplace content, search for marketplace content, download marketplace content, manage marketplace content, create and manage user accounts, read reviews on marketplace content, and otherwise interact with the marketplace service server 106. Although the web browser application 112 is illustrated as residing on the user device A 102A with the applications 110, 114, 116, and 118, it should be understood that, in some implementations, the user device A 102A includes only the web browser application 112 or the web browser application 112 and one or more of the applications 110, 114, 116, and 118, but not all of these applications.

The document template development application 114 is an application program through which a user can develop document templates. In some embodiments, the document template development application 114 is or includes a development environment in which document templates can be built using web technologies such as, but not limited to, HTML, JavaScript, and REST. In some embodiments, the document template development application 114 includes a functionality to facilitate submitting document templates to the marketplace service server 106 for inclusion in a virtual marketplace service provided by the marketplace service server 106. In other embodiments, the marketplace application 110 provides this functionality. Although the document template development application 114 is illustrated as residing on the user device A 102A with the applications 110, 112, 116, and 118, it should be understood that, in some implementations, the user device A 102A includes only the document template development application 114 or the document template development application 114 and one or more of the applications 110, 112, 116, and 118, but not all of these applications.

The distribution application 116 is an application program through which a user can distribute document templates containing web add-ins, as well as documents containing such document templates, to the user device B 102B, the user device N 102N, or other users devices (not shown). In some embodiments, the distribution application 116 is an email application, such as MICROSOFT OUTLOOK, available from Microsoft Corporation of Redmond, Wash., through which a user can create an email, attach a document containing a document template to the email, and send the email to one or more email addresses that are associated with one or more users. In some embodiments, the distribution application 116 is a file sharing application through which a user can share a document template, or a document containing a document template. It is contemplated that the file sharing application may or may not require a password or other authentication credentials to download the document template, or the document containing the document template. In some embodiments, the distribution application 116 is a media application. In some embodiments, the distribution application 116 is included in another application and is provided, at least in part, for distributing the document template within the other application, which may or may not be configured to utilize the document template. In some embodiments, the distribution application 116 is a web application accessible through the web browser application 112. Although the distribution application 116 is illustrated as residing on the user device A 102A with the applications 110, 112, 114, and 118, it should be understood that, in some implementations, the user device A 102A includes only the distribution application 116 or the distribution application 116 and one or more of the applications 110, 114, and 118, but not all of these applications.

The document template modifying application 118 is an application program that is configured to facilitate the incorporation of one or more document templates, as well as any associated web add-ins, into a document. In some embodiments, the document template modifying application 118 is an application such as, but not limited to, a word processing application, spreadsheet application, presentation application, drawing application, photography application, design application, video game application, music application, video application, or a collaboration application. In some embodiments, the document template modifying application 118 is MICROSOFT WORD, available from Microsoft Corporation of Redmond, Wash., MICROSOFT EXCEL, available from Microsoft Corporation of Redmond, Wash., MICROSOFT POWERPOINT, available from Microsoft Corporation of Redmond, Wash., MICROSOFT VISIO, available from Microsoft Corporation of Redmond, Wash., or MICROSOFT SHAREPOINT, available from Microsoft Corporation of Redmond, Wash., among others. Alternatively, the document template modifying application 118 may be any other application that supports document templates, as well as any associated web add-ins. Although the document template modifying application 118 is illustrated as residing on the user device A 102A with the applications 110, 112, 114, and 116, it should be understood that, in some implementations, the user device A 102A includes only the document template modifying application 118 or the document template modifying application 118 and one or more of the applications 110, 112 114, and 116, but not all of these applications. Further, in some embodiments, the web browser application 112 facilitates access to web applications configured to provide the same or similar functionality as described above for the document template modifying application 118.

The user device A 102A is illustrated as being in communication with a document data store 122, a document template data store 124, a web add-in data store 126, and an entitlement data store 128. The document data store 122, the document template data store 124, the web add-in data store 126, and the entitlement data store 128, or any combinations thereof, may be stored in a memory (not shown) of the user device A 102A or may be accessible from an external source that may be local or remote to the user device A 102A. In some embodiments, two or more of the data stores 122, 124, 126, and 128 are combined.

The document data store 122 is configured to store documents such as, but not limited to, word processing documents, spreadsheet documents, presentation documents, drawings documents, collaboration documents, or other documents created by or for the document template modifying application 118. The documents stored in the document data store 122 may include one or more documents derived from document templates. Further, such document templates may have one or more web add-ins embedded within or attached thereto. The documents stored in the document data store 122 may be opened by the document template modifying application 118. The documents stored in the data store 122 may include new or blank documents; documents created on the user device A 102A; documents downloaded to the user device A 102A from a website, an email attachment, a file sharing application, another computer or device such as the marketplace service server 106, the user device B 102B, or the user device N 102N; or documents transferred to the user device A 102A from an external memory device such as a flash memory drive, CD, DVD, or other physical media.

The document template data store 124 is configured to store document templates for facilitating the creation of documents such as, but not limited to, word processing documents, spreadsheet documents, presentation documents, drawings documents, and collaboration documents. The document templates stored in the document template data store 124 may have one or more web add-ins embedded within or attached thereto. In addition, documents derived from document templates, such as the document templates stored within the document template data store 124, may be stored within the document data store 122. Further, the user may choose which document templates to store within the document template data store 124, as well as which documents to store within the document data store 122.

In various embodiments, the document templates stored in the document template data store 124 may be opened by the document template modifying application 118. The licensing state of the document template may determine the quality, functionality, and accuracy of the document template that is opened within the document template modifying application 118. The document templates stored in the document template data store 124 may include new or blank document templates; document templates created on the user device A 102A; document templates downloaded to the user device A 102A from a website, an email attachment, a file sharing application, or another computer or device such as the web marketplace service server 106, the user device B 102B, or the user device N 102N; or document templates transferred to the user device A 102A from an external memory device such as a flash memory drive, CD, DVD, or other physical media.

In various embodiments, the document template modifying application 118 allows for varying levels of modification of a particular document template, or document derived from a document template. The level of modification which is provided by the document template modifying application 118 is determined by the licensing state of the document template. For example, the document template modifying application 118 may allow the user to add, delete, or change content within a document template. However, the quality, functionality, and accuracy with which the document template may be viewed or printed may vary according to the particular license obtained by the user.

In various embodiments, the web add-in data store 126 is a marketplace web add-in manifest store. In addition, in some embodiments, the web add-in data store 126 is configured to locally store web add-in manifests for web add-ins distributed throughout the marketplace service server 106. The web add-in manifests each include a reference to and a description of one or more web servers, such as one or more web servers hosted by or for the marketplace service server 106. The web add-in manifests stored in the web add-in data store 126 may include manifests created on the user device A 102A; manifests downloaded to the user device A 102A from a website, an email attachment, a document, a file sharing application, or another computer or device such as the marketplace service server 106, the user device B 102B, or the user device N 102N; or manifests transferred to the user device A 102A from an external memory device such as a flash memory drive, CD, DVD, or other physical media. In various embodiments, any number of the web add-in manifests stored within the web add-in data store 126 may be associated with web add-ins that are bound to any number of the document templates stored within the document template data store 124.

The entitlement data store 128 is configured to store entitlements for web add-ins and document templates, such as the document templates stored in the document template data store 124. Entitlements may include free entitlements, trial entitlements, and paid entitlements. Free entitlements may be configured to provide full or reduced functionality. Trial entitlements allow a user to access a document template with one or more restriction for using the document template. These restrictions include, but are not limited to, time restrictions, use restrictions, functionality restrictions, or any combinations thereof. In some embodiments, the user is provided an option to purchase the document template after expiration of the trial entitlement. Paid entitlements may include multiple tiers, such as basic and premium. A premium paid entitlement may provide additional functionality above and beyond the functionality provided with a basic paid entitlement. Paid entitlements may be subscription-based. Moreover, entitlements may be configured to auto-renew.

Time restrictions can be used to restrict the amount of time a document template can be used before a trial entitlement expires. In some embodiments, a time restriction is cumulative such that time using the document template is added until a time limit is reached, at which point the trial entitlement may expire. In some embodiments, a time restriction is reset after the time limit is reached. In these embodiments, any changes to the document template, or to a document to which the document template is being applied, may be reset or may be saved if the user purchases the web add-in. In some embodiments, a time restriction is combined with a functionality restriction or a use restriction.

Use restrictions can be used to restrict the number of times a document template can be used before a trial entitlement expires. Use restrictions can be used to restrict usage of a document template to a certain number of users. For instance, a trial entitlement for a document template may be acquired for a group of users, but a use restriction can limit the maximum number of users to, say, three users at a given. In some embodiments, each use has a time limit or other time restriction associated therewith. In some embodiments, a use restriction is combined with a time restriction or a functionality restriction.

Functionality restrictions can be used to restrict the functionality of a document template. For instance, a functionality restriction may restrict the functionality of a document template to being viewable and printable but not editable. Other functionality restrictions are contemplated. In some embodiments, a functionality restriction is combined with a time restriction or a use restriction.

In various embodiments, if an entitlement is obtained for a particular web add-in, associated document templates are provided for free. In other embodiments, if an entitlement is obtained for a particular document template, web add-ins which are bound to or contained within the document template are provided for free. Further, in other embodiments, entitlements for document templates and web add-ins are sold separately. For example, in some embodiments, an entitlement for a document template may be used to determine whether a user is authorized to download the document template from the marketplace service. However, once the document template has been downloaded, entitlements for particular web add-ins that are contained within or bound to the document template are used to determine a quality and level of functionality of the document template, or a document derived from the document template, within various applications.

In some embodiments, a user is provided a coupon code, voucher, or some other mechanism by which the user can choose one or more free document templates from the virtual marketplace. The user may acquire such mechanism by purchasing a document template modifying application, such as the document template modifying application 118, by using a trial version of the document template modifying application 118, or by way of a promotion.

The marketplace service server 106 is configured to execute a server operating system 130 and one or more application programs such as, in the illustrated embodiment, a marketplace server application 132, web add-in service applications 134, a transaction management application 136, an entitlement management application 138, and one or more other applications (not shown). The server operating system 130 is a computer program for controlling the operation of the marketplace service server 106. The application programs are executable programs configured to execute on top of the server operating system 130 to provide various functionalities described herein.

Although the applications 132, 134, 136, and 138 are illustrated as being hosted on the marketplace service server 106, in some implementations, these applications each reside on different servers (not shown) or are distributed over a plurality of servers. In some implementations, some other combination of the applications 132, 134, 136, and 138 reside on the marketplace service server 106, as well one or more different servers (not shown). Accordingly, the illustrated embodiment should not be interpreted as being limited to a server that necessarily includes all of the illustrated applications 132, 134, 136, and 138.

The marketplace server application 132 is a server application program configured to provide infrastructure for a virtual marketplaces service through which document templates, as well as any corresponding web add-ins, can be downloaded and purchased. The marketplace server application 132, in some embodiments, provides account creation and management tools to facilitate the creation and management of user and developer accounts. The marketplace server application 132, in some embodiments, is configured to communicate with a user account data store 140 for storing user accounts and associated user information such as usernames, passwords, or other authentication credentials, e.g., names, email addresses, mailing addresses, telephone numbers, user preferences, payment account information, favorites, and the like. The marketplace server application 132 is also configured to communicate with a developer account data store 142 for storing developer accounts and associated developer information, which may include information similar to the user information described above and may additionally or alternatively include developer-specific information, such as active document templates deployed on the marketplace, pending document templates, income deposit account information, and the like. Although the marketplace server application 132 is illustrated as residing on the marketplace service server 106 with the applications 134, 136, and 138, it should be understood that, in some implementations, the marketplace service server 106 includes only the marketplace server application 132 or the marketplace server application 132 and one or more of the applications 134, 136, and 138, but not all of these applications.

The marketplace server application 132 may facilitate, at least in part, a document template approval process through which a document template developer can submit a document template for inclusion in the virtual marketplace service and receive an indication of whether or not the document template is accepted. The marketplace server application 132, in some embodiments, facilitates the submission of document template descriptions, preview images or videos, and updates, as well as the management of document templates. Further, the marketplace server application 132 may facilitate the aforementioned functionalities for documents derived from such document templates, wherein the documents may contain web add-ins which are contained within or bound to the document templates from which the documents were derived. In some embodiments, some or all of the aforementioned functionality is included in a separate marketplace developer portal application (not shown), which may operate on the marketplace service server 106, as well as one or more other servers (also not shown).

In some embodiments, the marketplace server application 132 is a server application program that is configured to deliver web site content associated with a virtual marketplace service to the user device A 102A. In particular, the marketplace server application 132 may host a web site or a portion thereof, may receive requests for web pages of the web site from the user device A 102A, and may deliver the web pages to the user device A 102A in response thereto. In some embodiments, the marketplace server application 132 provides a web-based version of the marketplace application 110 so that the marketplace is accessible from any computer or device that has an Internet connection instead of the marketplace application 110 having to be installed thereon.

The web add-in service applications 134 are configured to enable features of one or more document templates including one or more web add-ins. In some embodiments, this may be provided by one or more of the following: (1) one or more HTML files; (2) one or more JavaScript files; and (3) one or more web services to access server-side functionality and content that add value to a document or application. Although the web add-in service applications 134 are illustrated as residing on the marketplace service server 106 with the applications 132, 136, and 138, it should be understood that, in some implementations, the marketplace service server 106 includes only the web add-in service applications 134 or the web add-in service applications 134 and one or more of the applications 132, 136, and 138, but not all of these applications.

The transaction application 136 is a server application program that is configured to manage transactions between the marketplace service server 106 and other devices, such as the user device A 102A. In some embodiments, the transaction application 136 is configured to process payments for marketplace content, issue refunds where appropriate, or provide pay-outs to developers for income earned through the sale of the developers' applications or document templates in the virtual marketplace service. In some embodiments, the transaction application 136 is configured to accept a proprietary currency that is useable within the virtual marketplace service and may or may not be useable elsewhere. In some embodiments, the transaction application 136 communicates with one or more credit card company computers, bank computers, or other financial institutions to process payments and perform other operations described above. Although the transaction application 136 is illustrated as residing on the marketplace service server 106 with the applications 132, 134, and 138, it should be understood that, in some implementations, the marketplace service server 106 includes only the transaction application 136 or the transaction application 136 and one or more of the applications 132, 134, and 138, but not all of these applications.

The entitlement management application 138 is a server application program that is configured to manage entitlements for users of the virtual marketplace service. In the illustrated embodiment, the marketplace service server 106 is configured to receive entitlement requests from the user device A 102A, the user device B 102B, and the user device N 102N, and to provide entitlement responses in response thereto. In particular, upon receipt of an entitlement request, the entitlement management application 138 can update an entitlement record for a user associated with the entitlement request to indicate the entitlement associated with the user for a particular document template. The entitlement management application 138, in some embodiments, handles restrictions and instructs the user device A 102A, or other device to which an entitlement has been sent, to prompt a user to purchase an entitlement upon expiration of a trial entitlement. The entitlement management application 138 is also configured to perform other entitlement management operations described herein, such as the revocation of expired entitlements or entitlements for which refunds have been requested. Although the entitlement management application 138 is illustrated as residing on the marketplace service server 106 with the applications 132, 134, and 136, it should be understood that, in some implementations, the marketplace service server 106 includes only the entitlement management application 138 or the entitlement management application 138 and one or more of the applications 132, 134, and 136, but not all of these applications.

The marketplace service server 106 is illustrated as being in communication with the user account data store 140, the developer account data store 142, an entitlement data store 144, and a document template data store 146. The user account data store 140, the developer account data store 142, the entitlement data store 144, and the document template data store 146 may be stored in a memory (not shown) of the marketplace service server 106 or may be accessible from an external source that may be local or remote to the marketplace service server 106. In some embodiments, two or more of the data stores 140, 142, 144, and 146 are combined.

The entitlement data store 144 is configured to store entitlements for document templates and web add-ins, such as the document templates stored in the document template data store 146. Entitlements may include free entitlements, trial entitlements, and paid entitlements. Free entitlements may be configured to provide full or reduced functionality. Trial entitlements allow a user to access a document template with one or more restrictions for using the document template, or web add-ins within the document template. These restrictions include, but are not limited to, time restrictions, use restrictions, functionality restrictions, or any combinations thereof, as discussed above. In some embodiments, the user is provided an option to purchase the document template after expiration of the trial entitlement. Paid entitlements may include multiple tiers, such as basic and premium. A premium paid entitlement may provide additional functionality above and beyond the functionality provided with a basic paid entitlement. In some embodiments, the entitlement data store 144 is configured to store entitlement terms.

The document template data store 146 is configured to store document templates, including document templates bound to web add-ins. In some embodiments, the document templates stored in the document template data store 146 may include document templates created on the user device A 102A and uploaded to the marketplace service server 106 for inclusion in the virtual marketplace service; document templates uploaded from other sources such as a developer; document templates downloaded from a website, an email attachment, a document, a file sharing application, or another computer or device; or document templates transferred to the marketplace service server 106 from an external memory device such as a flash memory drive, CD, DVD, or other physical media. In various embodiments, the document template data store 146 may also store documents derived from document templates.

Although the marketplace server application 132, the web add-in service applications 134, the transaction management application 136, and the entitlement management application 138 are illustrated as operating on the marketplace service server 106, it is contemplated that these applications, separately or together in some combination, may operate on one or more other server computers (not shown). In some embodiments, two or more of the marketplace server application 132, the web add-in service applications 134, the transaction management application 136, and the entitlement management application 138 are combined.

In the illustrated embodiment, the user device A 102A is configured to download a document template 148 from the marketplace service server 106 and distribute the document template 148 to the user device B 102B and the user device N 102N. In some embodiments, each user device is configured to generate and send an entitlement request 150A to the marketplace service server 106 and to receive an entitlement response 150B from the marketplace service server 106 in response thereto. Further, in various embodiments disclosed herein, the system described below with respect to FIG. 2 is used to authenticate entitlements for the document template.

It should be understood that some implementations of the operating environment 100 include multiple networks 104, multiple marketplace service servers 106, multiple document data stores 122, multiple document template data stores 124, multiple web add-in data stores 126, multiple entitlement data stores 128, multiple user account data stores 140, multiple developer account data stores 142, multiple entitlement data stores 144, or multiple the document template data stores 146, or any combinations thereof. It should also be understood that multiple operating systems 108, multiple marketplace applications 110, multiple web browser applications 112, multiple document template development applications 114, multiple distribution applications 116, or multiple document template modifying applications 118, or any combinations thereof, may be used by the user device A 102A or one or more other user devices, such as the user device B 102B, the user device N 102N, or other devices (not shown). It should also be understood that multiple server operating systems 130, multiple marketplace server applications 132, multiple transaction applications 136, or multiple entitlement management applications, or any combinations thereof, may be used by the marketplace service server 106 or one or more other server computers (not shown). Thus, the illustrated embodiments should be understood as being illustrative, and should not be construed as being limiting in any way unless otherwise noted.

Figure 2:
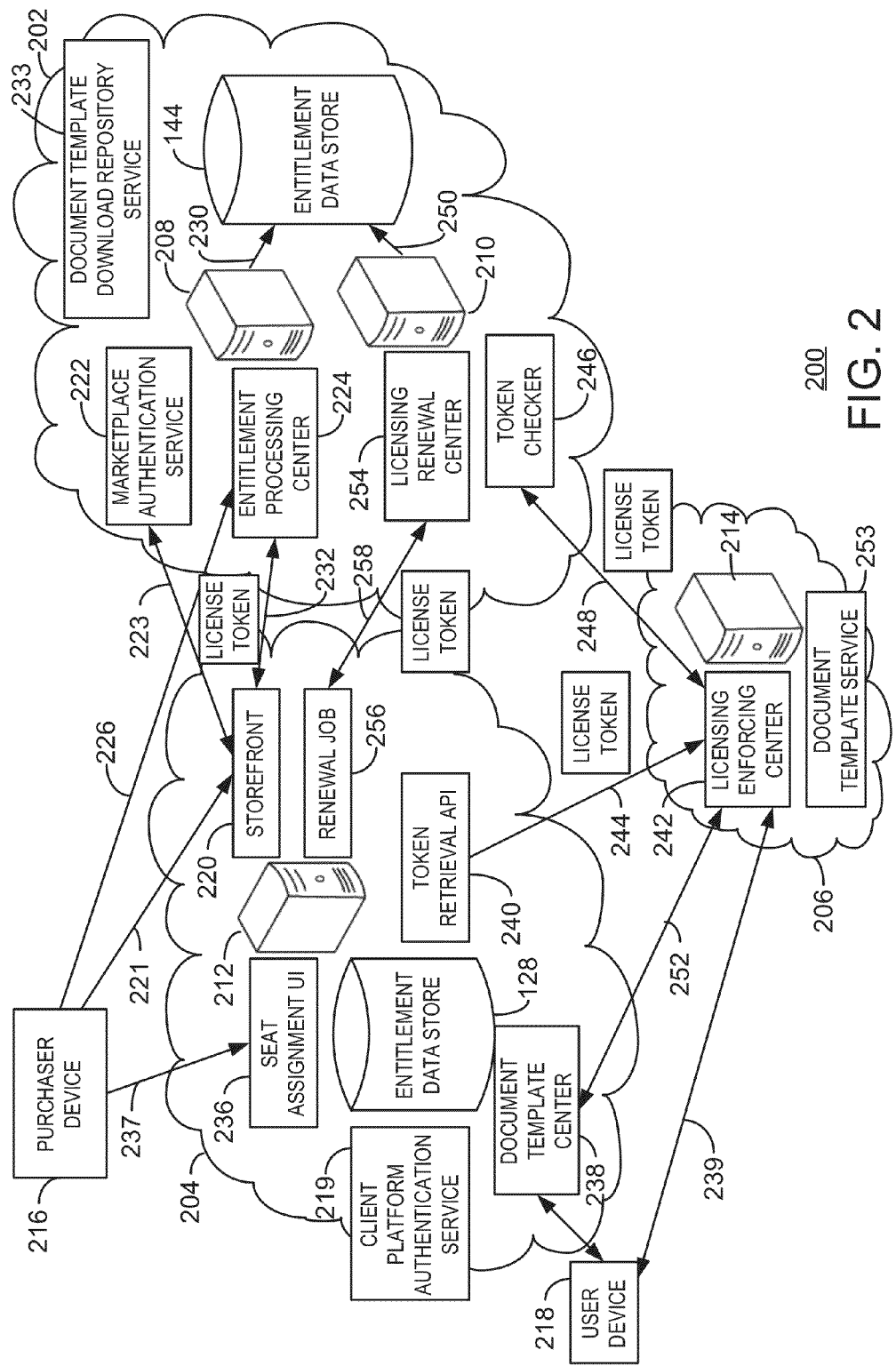
FIG. 2 is an embodiment of a system for document template licensing authentication within a marketplace environment.

FIG. 2 is an embodiment of a system 200 for document template licensing authentication within a marketplace environment. Like numbered items are as described with respect to FIG. 1. The system 200 may include a marketplace service 202, such as the marketplace service server 106, a client platform 204, and a third party service 206. As shown in FIG. 2, the marketplace service 202, the client platform 204, and the third party service 206 may include servers 208 and 210, 212, and 214, respectively. Further, in various embodiments, the marketplace service 202 may include any number of the components 130, 132, 134, 136, 138, 140, 142, 144, and 146 discussed with respect to the marketplace service server 106.

The third party service 206 may be configured to directly control access to services offered by web add-ins in a particular document template. In various embodiments, the third party service may be a service provided using, for example, HTPP protocol, FTP protocol, or HTTPS protocol, or may be a service provided using a custom non-HTTP protocol, such as a direct DCE/RPC call.

The number of servers is not limited to those shown in this example. In a cloud computing arrangement, 10s, 100s, or even 1000s of servers may be used. Further, the servers 208, 210, 212, and 214 may be virtual, i.e., servers implemented by software emulation. The servers 208, 210, 212, and 214 may include web servers, cloud servers, and other computing architectures that provide content to other servers or computing devices, such as, for example, a purchaser device 216 and a user device 218. In some embodiments, the purchaser device 216 may be the user device A 102A, while the user device 218 may be the user device B 102B or the user device N 102N, among others. In some embodiments, the servers 208 and 210 within the marketplace service 202 may function as a server for storefront services and a server for licensing services, respectively. Moreover, in embodiments disclosed herein, the term "purchaser device" may be used to denote any type of computing device operated by a particular "purchaser," wherein the purchaser may be an administrator for a particular document template license. Additionally, the term "user device" may be used to denote any type of computing device operated by a particular "user," wherein the user may be a licensed user or an unlicensed user.

The marketplace service 202, the client platform 204, and the third party service 206 may be coupled to each other through a network (not shown), wherein the network may include any type of network or combination of networks that provide access to the servers 208, 210, 212, and 214. In some embodiments, for example, the network may be a local area network (LAN), a wide area network (WAN), a wireless wide area network (WWAN), the Internet, or any combinations thereof. In addition, the marketplace service 202, the client platform 204, and the third party service 206, or any combinations thereof, may be colocated and physically coupled to each other.

The third party service 206 may provide services to the document template modifying application 118 running on the user device 218. In various embodiments, the application code may run on top of the client platform 204 and may call the third party service 206. Alternatively, the application code may run on top of the document template modifying application 118 on the client platform 204 without leveraging the third party service 206 at all. In both instances, the third party service 206 or the client platform 204, or both, may call the licensing service. Further, in some embodiments, the application may run on a separate device to the client platform 204, such as a personal computer or a mobile device. In some embodiments, the application may run on the purchaser device 216 or the user device 218, among others. For example, the application may be any of the applications 110, 112, 114, 116, or 118 being run on the user device A 102A. Additionally, the application may communicate with the client platform 204, as well as the third party service 206, through specific services, including both HTPP and non-HTTP protocols.

The client platform 204 may be hosted on a server, such as the server 212, or the same capabilities may be hosted on software running on the purchaser device 216 or the user device 218. In various embodiments, the purchaser may log in to the client platform 204 by entering a username and password to authenticate against the client platform authentication service 219. The purchaser may then view a variety of document templates. The purchaser device 216 may locate a desired document template through the storefront 220, as indicated by an arrow 221. Once the purchaser has located the document template, the purchaser may interact with the storefront 220 in the browser of the purchaser device 216 to begin the transaction. The purchaser device may then navigate from the storefront 220 to the marketplace authentication service 222 within the marketplace service 202, as indicated by the arrow 223. At this point, information is passed to the marketplace service 202 about the document template the purchaser wishes to purchase (such as an application ID), the desired license (e.g., full, premium, or trial) and the client platform's identity (such as a deployment identifier, or ID) and its location (such as a Uniform Resource Identifier, or URI, for the location of the client platform 202, which may be referred to as a callback URI). In one embodiment, this information is passed as parameters in the URI from the storefront 220 to the marketplace service 202. The purchaser may then be prompted to sign in to the marketplace service 202 via the marketplace authentication service 222. In one embodiment, the marketplace authentication service 222 may use a different form of authentication than is used by the client platform authentication service 229. Moreover, in various embodiments, any of a number of authentication techniques may be used to authenticate the user, such as, for example, Windows NT authentication developed by Microsoft® Corporation, Windows Live ID Web Authentication developed by Microsoft® Corporation, Kerberos Authentication, or Form-Based Authentication. Additionally, in an embodiment, the marketplace authentication service 222 may operate within the server 208.

After log-in, the purchaser device 216 may buy a paid license for the desired document template within an entitlement processing center 224, as indicated by an arrow 226, or may request a free trial license for the desired document template. If the license is a paid license, it may have an associated level of entitlement, such as a premium paid license or a basic paid license, among others. In addition, paid licenses and trial licenses may each have a specific expiration date. Moreover, some free licenses may not have an expiration date but, rather, may allow a user unlimited access to specific services. After the entitlement has been processed by the entitlement processing center 224, information relating to the purchase, including information about the license for the document template and information about the purchaser of the license, may be sent to the entitlement data store 144, as indicated by an arrow 230. In some embodiments, the information about the purchaser of the license may include, for example, the purchaser's marketplace identity and an identifier for the client platform such as a deployment identifier.

For instances in which the client platform 204 is hosted on software running on the purchaser device 216 or the user device 218, the entitlement for the document template may be purchased by the purchaser directly through the marketplace service 202 after the purchaser has logged in to the marketplace service 202. In such instances, the user must sign in to an application on the user device, such as document template modifying application 118, using the marketplace authentication. Then, the storage of the entitlement, retrieval of the token, and the renewal of the entitlement may be performed on the purchaser device 216 or the user device 218, rather than on a centralized server.

In addition, for instances in which the client platform 204 is hosted within a server, after the payment for the license has been processed, or the free trial license has been granted, a token for the license may be sent back to the purchaser device 216 through the storefront 220 within the client platform 204, as indicated by the arrow 232. In embodiments, the token may be referred to as an "entitlement token." The marketplace service 202 may store the entitlement token in the entitlement data store 144 or in a cloud-based store called an "entitlement store" (not shown), or both. The token may include a key ID that may be used to create a digital digest. The token may also include information relating to the date of the purchaser's last log-in to the marketplace service 202 and an expiration date for the token, such as, for example, thirty days after the token is issued. In some embodiments, the digest that is created using the key ID may be a hash-based message authentication code (HMAC) digest. In some embodiments, the token may also contain encrypted information that can be decrypted by a particular service, such as the third party service 206, or a separate key provided to the developer of the token.

After the token has been generated within the marketplace service 202, the purchaser device 216 may be redirected to the storefront 220 within the client platform 204 by a callback URI having the embedded token. The callback URI may be passed to the client platform 204 from a document template download repository service 233 within the marketplace service 202. In some embodiments, the token may be embedded within the URI. Once the purchaser's browser receives the token, as well as a product code for the application, the token and the product code may be read from the URI by the storefront 220 and then persisted locally in the entitlement data store 128. Further, in embodiments in which the client platform 204 is hosted on software running on the purchaser device 216 or the user device 218, the token and the product code may be stored within the entitlement data store 128 located on the purchaser device 216 or the user device 218.

The purchaser device 216 may be allowed to assign a purchased number of seats for the license to users, wherein each license may have a different number of purchased seats. The purchaser device 216 may assign a seat to the user device 218, as well as to a number of additional user devices, through the seat assignment user interface (UI) 236 within the client platform 204, as indicated by the arrow 237. The seat assignments, or seat mapping, may then be stored within the entitlement data store 128. Further, in some embodiments, the seats may be assigned based on the hardware signatures of particular user devices. Moreover, in some embodiments, a device other than the purchaser device 216 may be used to assign the seats to the users.

In embodiments in which the client platform 204 is hosted within a server, the entitlement data store 128 may include information relating to the purchaser who is operating the purchaser device 216, wherein the purchaser may be designated as the administrator of the license. In an embodiment, all of the assigned user devices within the client platform 202, including the user device 218 and the purchaser device 216, may be authenticated using the same entitlement token. Moreover, once a particular user device 218 has been authenticated using the entitlement token, validation may be performed to verify that the user that is signed-in matches the user ID of the entitled user.

Further, in some embodiments, if the client platform 204 is hosted within a server, the user device 218 may install and attempt to access the particular document template through a document template center 238, which is running within the client platform 204. In other embodiments, if the client platform 204 is hosted on software running on the purchaser device 216 or the user device 218, the user may attempt to access the particular document template through the document template center 238, which is running within the purchaser 216, the user device 218, or a browser. In various embodiments, the document template center 238 may be the place where the underlying code for the specific document template runs inside the client platform 204. In addition, the user device 218 may also attempt to access the document template directly through the third party service 206, as indicated by an arrow 239. In some embodiments, the user device 218 may attempt to access the document template by entering a specific deployment ID relating to a specific entitlement token. At runtime, the document template may call a token retrieval application programming interface (API) 240 within the client platform 204. The token retrieval API 240 may retrieve the entitlement token for the license for the particular document template that the user device 218 is attempting to access. The token retrieval API 240 may then pass the entitlement token to the third party service 206 that powers the document template. Specifically, the entitlement token may be passed to a licensing enforcing center 242 within the third party service 206, as indicated by the arrow 244.

The licensing enforcing center 242 within the third party service 206 may pass the received entitlement token to a token checker 246, or license verification center, within the marketplace service 202, as indicated by the arrow 248. In some embodiments, the token checker 246 may be stored within the server 210. The token checker 246 may verify the integrity of the entitlement token by checking the information relating to the token that is stored within the entitlement data store 144, as indicated by the arrow 250. For example, the token checker 246 may check the integrity of the token using the HMAC digest. The token checker 246 may check the expiry date of the entitlement token and the expiry date of the license, and may audit the token in order to detect the fraudulent replaying of the same token. The token checker 246 may also verify that the license is still valid. Furthermore, in some embodiments, the client platform 204 itself may directly verify the validity of the entitlement token via the token checker 246.

Once the token checker 246 has decided whether the entitlement token is valid or invalid, the token checker 246 may send a message of valid or invalid back to the licensing enforcing center 242 within the third party service 206, as indicated by the arrow 248. The third party service 206 may then decide how to allow the user device 218 to access the document template based on the received message. The decision of the third party service 206 may be sent back to the document template center 238, as indicated by the arrow 252. If the third party service 206 decides that the entitlement token is invalid, the user device 218 interfacing with the document template center 238 may receive an error message indicating that access to the document template has been denied, or, alternatively, the document template may be allowed to run in a reduced-functionality mode, e.g., in a read-only mode. Otherwise, if the third party service 206 decides that the entitlement token is valid, the user device 218 may be allowed to access the resources of the document template, which may be powered by the third party service 206 via a document template service 253. The document template service 253 may be used to provide particular experience levels for document templates, or documents derived from document templates, to users, depending on the conditions of particular entitlements. For example, the document template service 253 may provide unlicensed users with a document template containing watermarked images or low quality video.

In addition, the document template service 253 may provide specific levels of functionality for document templates, depending on the conditions of particular entitlements. For example, in some embodiments, the entitlement token may specify what the user is allowed to see on their screen. Thus, the document template service 253 may adjust the viewing information that is provided to the user device 218 accordingly. In other embodiments, if the user is a licensed user, the user may see low quality watermarked imagery within a document created from a document template on the screen of the user device 218. However, the printing of the imagery within the document created from the document template may be in high resolution. Further, in some embodiments, the data in a document created from a document template may be static for unlicensed user, while it may be updated for licensed users. Therefore, the document template service 253 may adjust the functionality and quality of each document template according to the specific conditions provided by each entitlement.

In some embodiments, a licensing renewal center 254 within the marketplace service 202 may periodically communicate with a renewal job center 256 within the client platform 204, as indicated by the arrow 258. The licensing renewal center 254 may be stored within the server 210. If the token checker 246 determines that a particular license has expired, the license may be renewed within the licensing renewal center 254. In some embodiments, the token checker 246 may verify that a user's subscription is still valid before renewing the particular license. Moreover, the token checker 246 may determine that a license is desired for any reason, such as, for example, to include richer entitlement information or more secure encryption features. Thus, the license may be renewed within the licensing renewal center 254 at any time. Once a license has been renewed, the information relating to the new license, including a new entitlement token, may be sent to the renewal job center 256. However, if an expired license is not renewed, the token checker 246 may inform the third party service 206 that the entitlement token for the license is invalid.

Figure 3A:
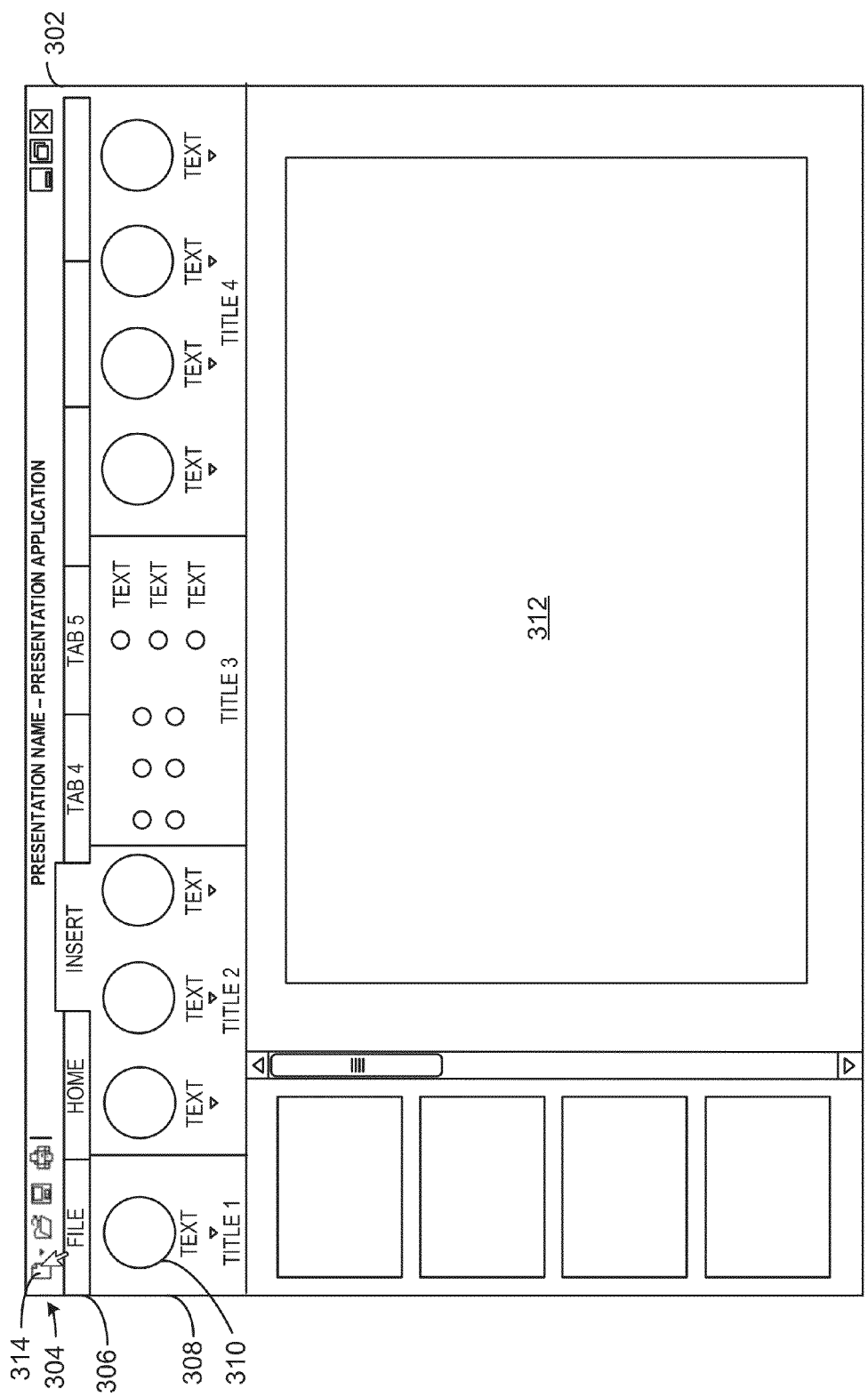
FIG. 3A is a schematic of an illustrative user interface that may be provided by a document template modifying application.

FIG. 3A is a schematic 300 of an illustrative user interface 302 that may be provided by a document template modifying application. In various embodiments, the document template modifying application may be the document template modifying application 118 or the document template development application 114 described with respect to FIG. 1. Further, in various embodiments, the document template modifying application may be a presentation application, and a user may be interacting with the user interface 302 to create a specific presentation, as shown in FIG. 3A.

The document template modifying application may be included within a computing device, such as the user device A 102A, user device B 102B, or user device N 102N described with respect to FIG. 1. In addition, the user interface 302 may be displayed to the user via a display device that resides within the computing device, or that is communicably coupled to the computing device via a display interface.

The user interface 302 may include a ribbon interface 304. The ribbon interface 304 is a user interface including a set of toolbars that are placed on tabs in a tab bar 306. In the illustrated embodiment, the tab bar 306 of the ribbon interface 304 includes tabs for FILE, HOME, INSERT, TAB 4, and TAB 5. Also in the illustrated embodiment, the INSERT TAB has been selected and various toolbars associated with various contents available for insertion are shown in a ribbon interface body 308. The illustrated toolbars in the ribbon interface body 308 each include a representative icon 310 for the type of feature provided by the toolbar.

The user interface 302 may include a presentation canvas 312 upon which a user can insert content for creating a presentation, such as a MICROSOFT POWERPOINT presentation. The illustrated user interface 302 also includes a document selection option 314, the selection of which triggers a document drop-down menu to be displayed in the user interface 302, as discussed further with respect to FIG. 3B.

Figure 3B:
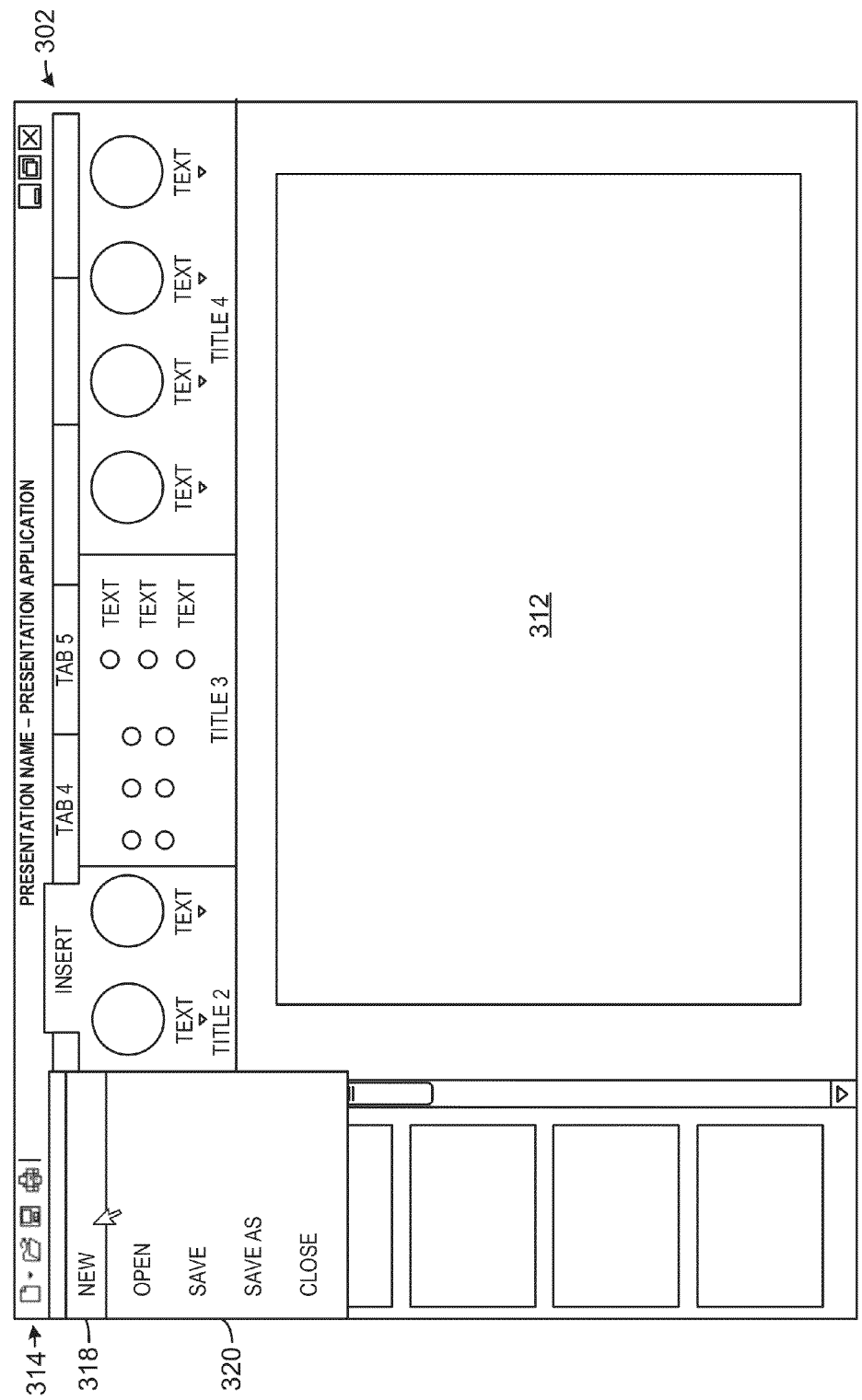
FIG. 3B is a schematic 316 showing a selection of a new document selection option within the illustrative user interface.

FIG. 3B is a schematic 316 showing a selection of a new document selection option 318 within the illustrative user interface 302. The new document selection option 318 may be selected from a number of document selection options displayed within the document drop-down menu 320.

Figure 3C:
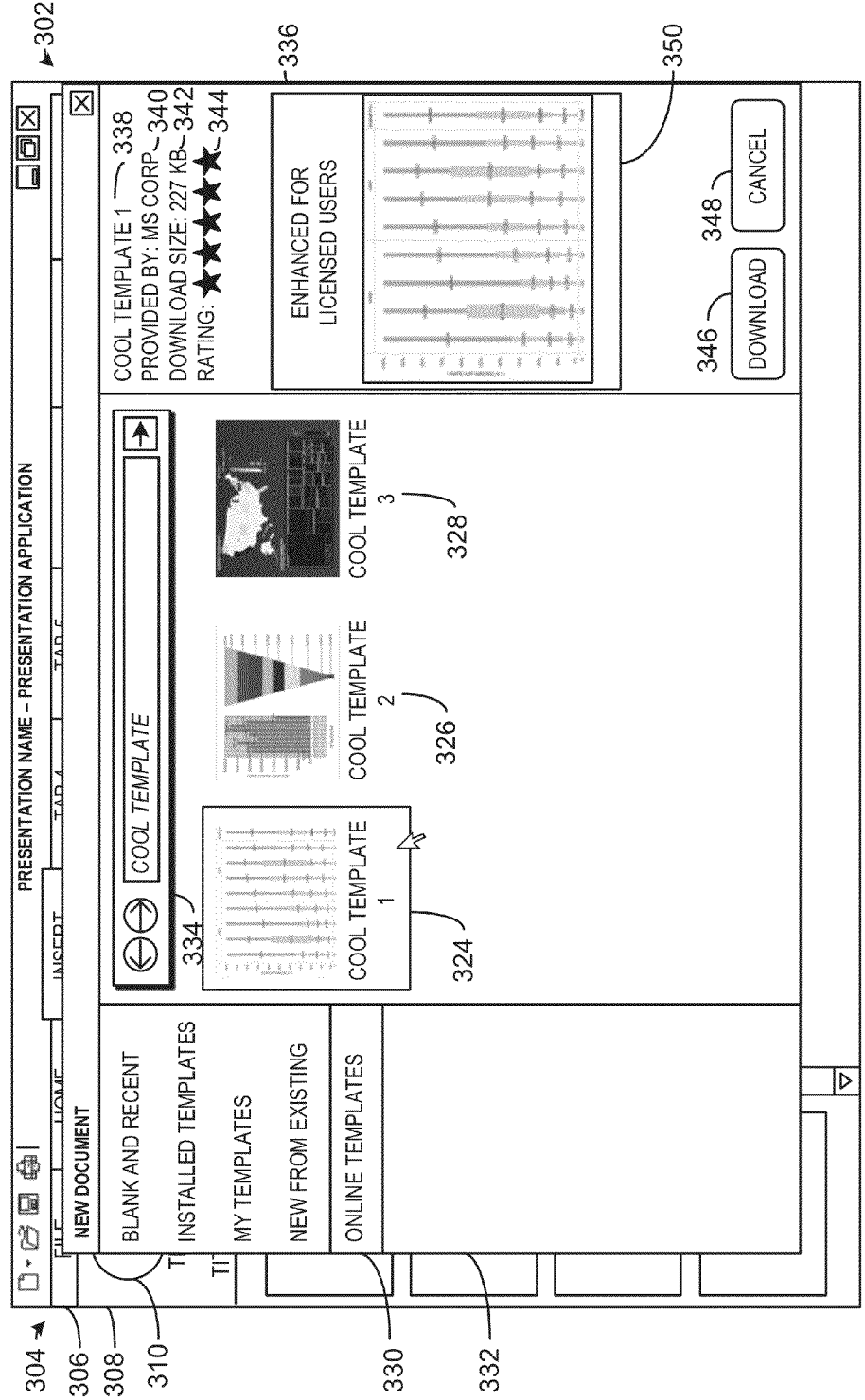
FIG. 3C is a schematic showing a selection of a document template from a number of document template options following a selection of an online templates option within a new document menu.

FIG. 3C is a schematic 322 showing a selection of a document template 324 from a number of document template options 324, 326, and 328 following a selection of an online templates option 330 within a new document menu 332. In various embodiments, once the online templates option 330 has been selected from the new document menu 332, a template search bar 334 is displayed. The template search bar 334 facilitates searching for templates by one or more search terms. In the illustrated embodiment, a user has searched for "COOL TEMPLATE," and a plurality of search results matching these search terms have been displayed, including the document template options 324, 326, and 328. Further, the user has selected the desired document template, i.e., the document template 324, from the document template options 324, 326, and 328.

In various embodiments, once the document template 324 has been selected, a template details interface 336 is displayed in the user interface 302. The illustrated template details interface 336 includes a template name field 338, a template source field 340, a download size field 342, a rating field 344, a download option button 346, and a cancel option button 348. The template details interface 336 may also display a preview window 350, in which a preview of a functional, or rich, experience of the document template 324 is displayed. The preview window 350 may also display a message indicating that the functional experience of the document template 324 is only available to licensed users, as shown in FIG. 3C.

Figure 3D:
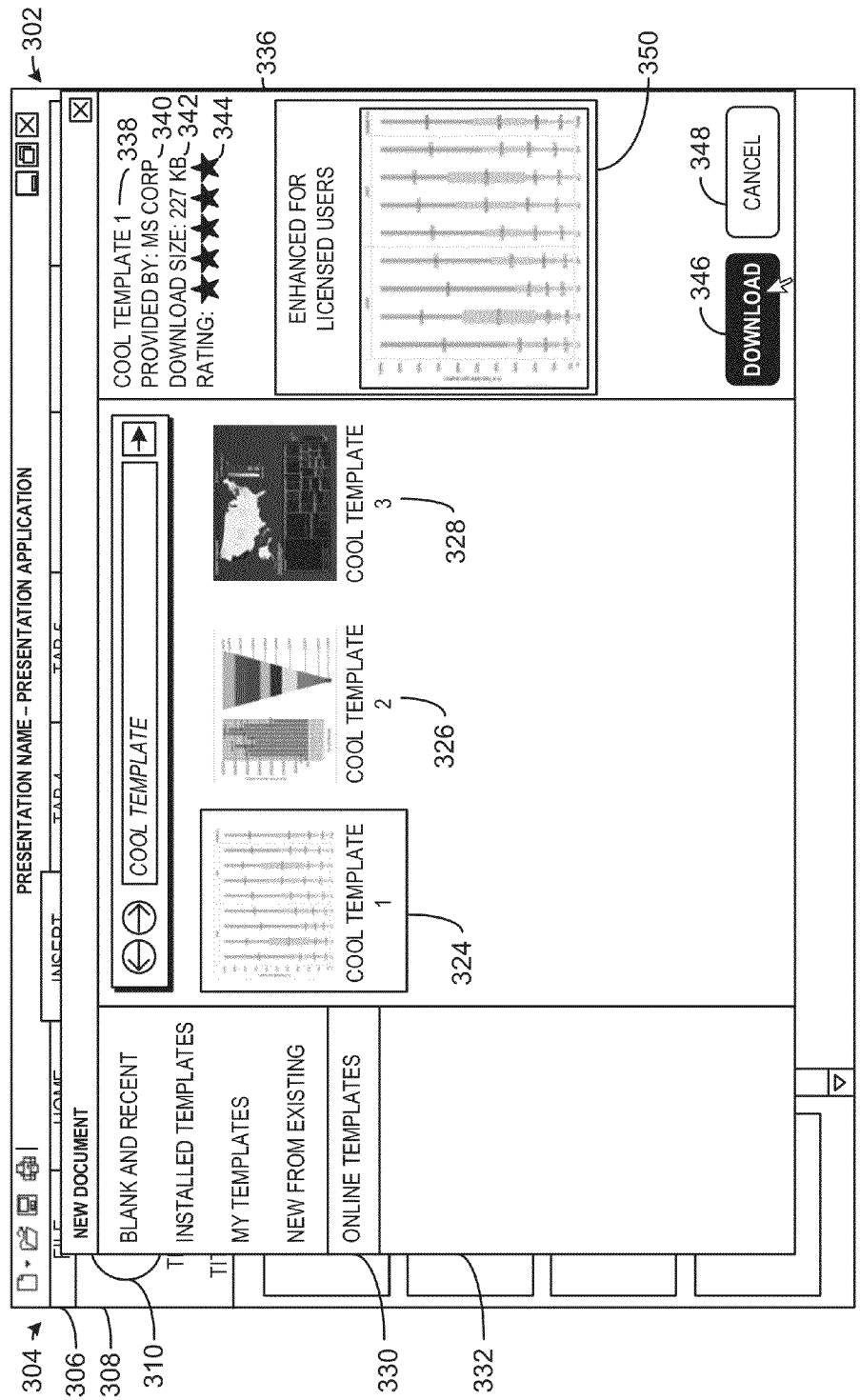
FIG. 3D is schematic showing a selection of the download option button for downloading the selected document template.

FIG. 3D is schematic 352 showing a selection of the download option button 346 for downloading the selected document template 324. In response to the download option button 346 being selected by the user, the document template 324 may be downloaded to the computing device.

Figure 3E:
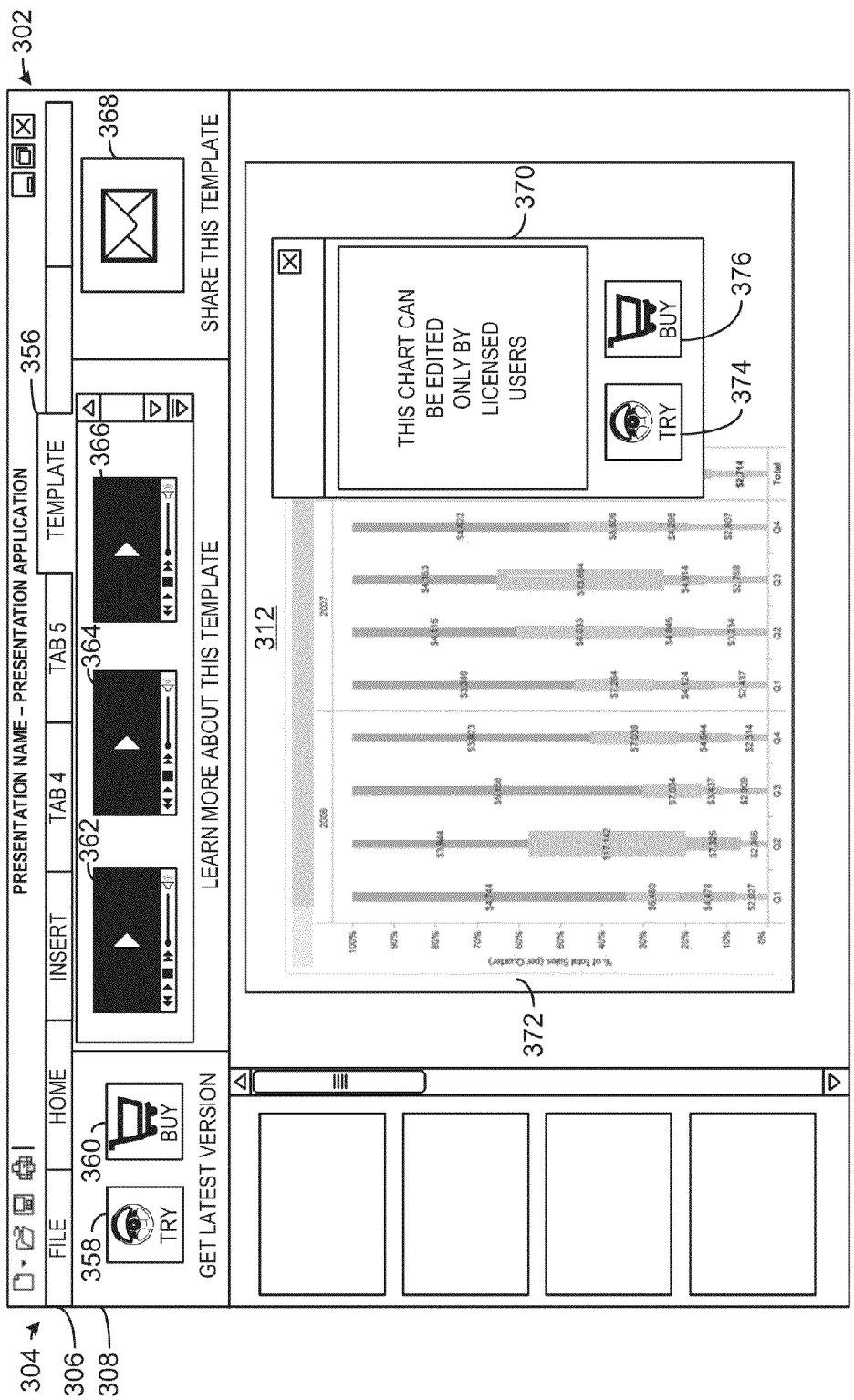
FIG. 3E is a schematic showing a restricted version of the downloaded document template.

FIG. 3E is a schematic 354 showing a restricted experience of the downloaded document template 324. In the illustrated embodiment, the template creates a template tab 356 in the tab bar 306. Moreover, the template tab 356 has been selected and, in response, the ribbon interface body 308 is populated with a try button 358, a buy button 360, a plurality of template teaching videos 362, 364, and 366, and a share template button 368.

In various embodiments, if the user of the computing device is an unlicensed user, a license-restricted document 324 may be displayed to the user. Such a license-restricted document 324 may include a reduced-functionality experience of the document template 324. In addition, the quality of the document template 324 may also be reduced. In some embodiments, the user interface 302 displays a message to the user within a message window 370. The message may notify the user of the limited capabilities of the license-restricted document 324. For example, the message within the message window 370 may notify the user that a chart 372 included in the document template 324 is editable only by licensed users, as shown in FIG. 3E. In addition, the message window 370 may include a try button 374 and a buy button 376. The try button 374 and the buy button 376 within the message window 370 may be equivalent to the try button 358 and the buy button 360 within the ribbon interface body 308, and may be displayed in the message window 370 for the convenience of the user.

Figure 3F:
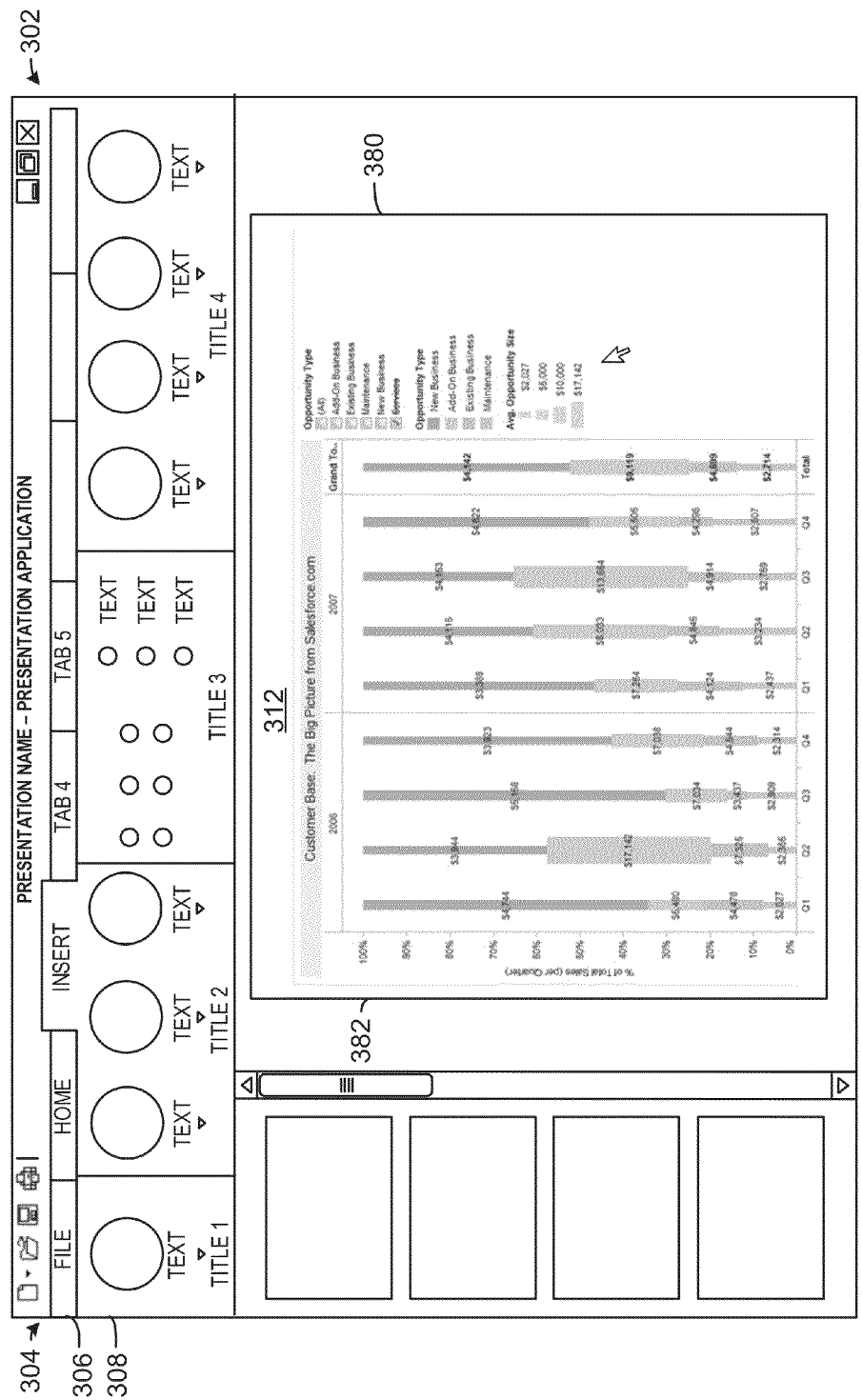
FIG. 3F is a schematic showing a functional version of the document template that is initiated once the user has either purchased the document template or requested a free trial of the document template.

FIG. 3F is a schematic 378 showing a functional experience 380 of the document template 324 that is initiated once the user has either purchased the document template 324 or requested a free trial of the document template 324. The functional experience 380 of the document template 324 may include a partially-functional experience of the document template 324 or a fully-functional experience of the document template 324, depending on the specific license obtained by the user. In addition, the functional experience 380 of the document template 324 may include an interaction of the user with a document derived from the document template 324.

In various embodiments, the user may purchase the document template 324 by selecting one of the buy buttons 360 or 376 and, upon prompting, entering credit card information or other purchasing information. Once the user has purchased the document template 324, the functional version 380 of the document template 324 may be initiated within the document template modifying application, and the user may be provided with an editable experience 382 of the chart 372, as well as any additional functionalities provided by the document template 324. In some embodiments, the particular license that is purchased by the user dictates the level of functionality and the quality of the document template 324. For example, the user may purchase a standard license that provides access to a partially-functional experience of the document template 324, or the user may purchaser a premium license that provides access to a fully-functional experience of the document template 324.

Further, in some embodiments, the user may request a trial version of the document template 324 by selecting one of the try buttons 358 and 374. The user may then receive a trial license for the document template 324 and may be provided with the editable experience 382, or at least partially-editable experience, of the chart 372. In some embodiments, the trial license may provide the user with access to a partially-functional, or possibly even a fully-functional, experience of the document template 324 for a limited amount of time or a limited number of uses.

Figure 4:
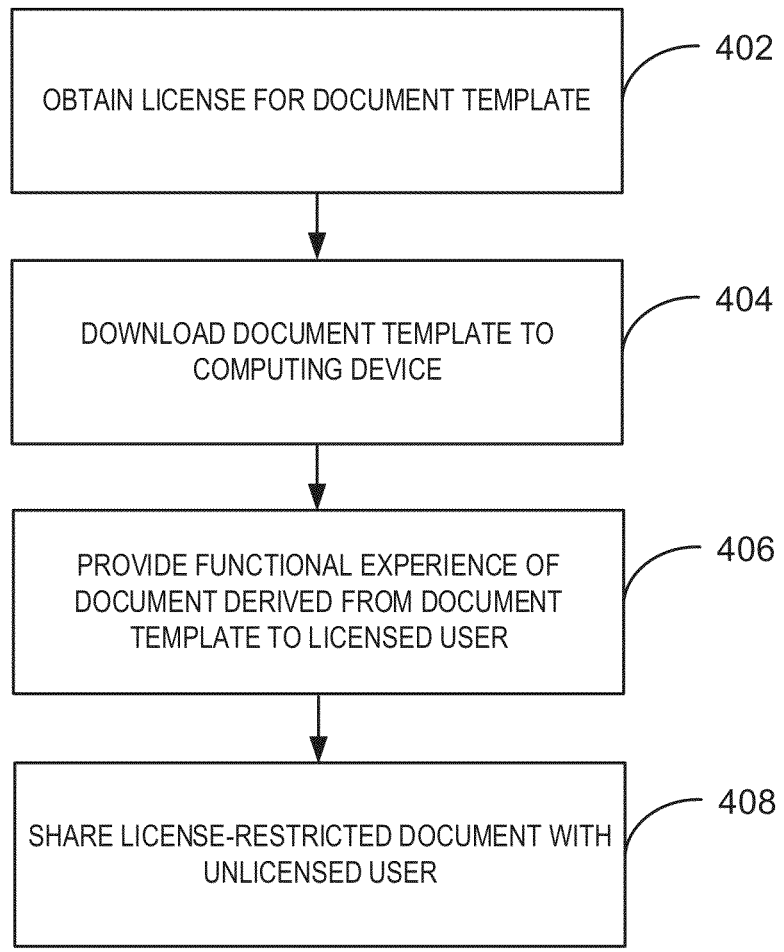
FIG. 4 is a process flow diagram showing a method for document template licensing.

FIG. 4 is a process flow diagram showing a method 400 for document template licensing. The method 400 may be used to enforce the licensing of document templates provided by the marketplace service and various third party services, as described further with respect to FIG. 5. The document template disclosed herein may include text, images, audio, or video, or any combinations thereof, as well as any number of web add-ins.

The method begins at block 402 with the obtainment of a license, or entitlement, for a document template. In various embodiments, the license is obtained from a marketplace service via a network. In some embodiments, the license is obtained from a third party service that may or may not be in communication with the marketplace service. Further, in some embodiments, the license for the document template includes one or more licenses for the web add-ins that are bound to the document template.

In various embodiments, the license may be obtained using the system 200 for document template licensing authentication described with respect to FIG. 2. For example, a request for the license for the document template may be sent from the computing device to the marketplace service in response to an input by a purchaser. A token may then be accepted from the marketplace service at the computing device via a client platform. The client platform may be configured to allow the purchaser to assign a seat to one or more users. According to this embodiment, the purchaser and the one or more users that were assigned seats are considered licensed users. Further, in some embodiments, a free trial license for the document template may be obtained by the purchaser or any of the one or more users.

Further, in various embodiments, the license for the document template may be obtained directly from the marketplace service. In such cases, a request for the license for the document template may be sent from the computing device to the marketplace service in response to an input by the user. The request may include, for example, marketplace log-in information of the user and payment information, such as the user's credit card information. The license for the document template may then be directly downloaded from the marketplace service to the computing device, as discussed further with respect to block 404.

At block 404, the document template may be downloaded to the computing device. For example, the document template may be downloaded from the marketplace service, or from any of a number of third party services. Moreover, in some embodiments, the document template may already be located on the computing device and, thus, may not be downloaded at block 404. Additionally, any web add-ins that are not contained within the document template, but have manifests that are referenced by the document template, may be downloaded to the computing device if they have not already been downloaded.

At block 406, a functional experience of a document derived from the document template may be provided to the licensed user. This may be accomplished by loading a document that includes, or is derived from, the document template within a target application on the computing device. In addition, each of the web add-ins within the document template may be activated by, for example, passing the web add-ins the relevant entitlement tokens. The functional experience of the document derived from the document template may provide a level of functionality that is in accordance with the conditions set forth in the license that was obtained by the licensed user. Thus, the functional experience of the document derived from the document template may be a fully-functional experience of the document, or a partially-functional experience of the document, depending on the specific license. In addition, the quality of the document derived from the document template may be adjusted according to the conditions set forth in the license.

At block 408, a license-restricted document may be shared with an unlicensed, or unauthorized, user. The license-restricted document may provide a reduced-functionality experience of the document derived from the document template to the unlicensed user. The license-restricted document may be shared with the unlicensed user, thereby providing them with reduced-functionality access to the document. For example, the license-restricted document may include content with watermarks, sample content, content that has not been updated, or low quality content, or any combinations thereof. The license-restricted document may also be a static mode of the document derived from the document template or a reduced-functionality mode of the document derived from the document template. Further, the reduced-functionality licensing of the document template may force use restrictions, time restrictions, or functionality restrictions, or any combinations thereof.

In various embodiments, when a document derived from a document template containing web add-ins is saved, the document file itself contains the lowest fidelity version of the content, or resources. However, the web add-ins that are bound to or located within the document template retain the high-fidelity resources online This allows such high-fidelity resources to be provided to licensed users in accordance with particular licenses for the document templates and/or web add-ins.

In various embodiments, sharing the license-restricted document with the unlicensed user includes sending, via a network, the document to a second computing device being used by the unlicensed user. The unlicensed user may then be allowed to use the license-restricted document for a limited amount of time, or for a limited number of uses. For example, the license-restricted document may be provided to the unlicensed user for a configurable level of time, or to a configurable quality of service Further, in some embodiments, sharing the license-restricted document with the unlicensed user includes providing the unlicensed user with a document containing fresh data but preventing automatic updating of the fresh data within the document. In addition, the unauthorized user may be provided with a document including customizations made to web add-in bound portions of the document, but may be prevented from making any additional customizations to the web add-in bound portions of the document. The unlicensed user may also be provided with a document including watermarked images. The unauthorized user may be allowed to add comments into the document, rearrange a layout of the document, or enter text into the document. Further, in some embodiments, the unlicensed user is provided with options to buy the document template to obtain a paid license, or try the document template using a trial license. Then, depending on the type of license obtained by the unlicensed user, a quality and functionality of the document derived from the document template may be adjusted.

FIG. 4 is not intended to indicate that the steps of the method 400 are to be executed in any particular order, or that all of the steps of the method 400 are to be included in every case. Further, any number of additional steps not shown in FIG. 4 may be included within the method 400, depending on the specific application.

Figure 4A:
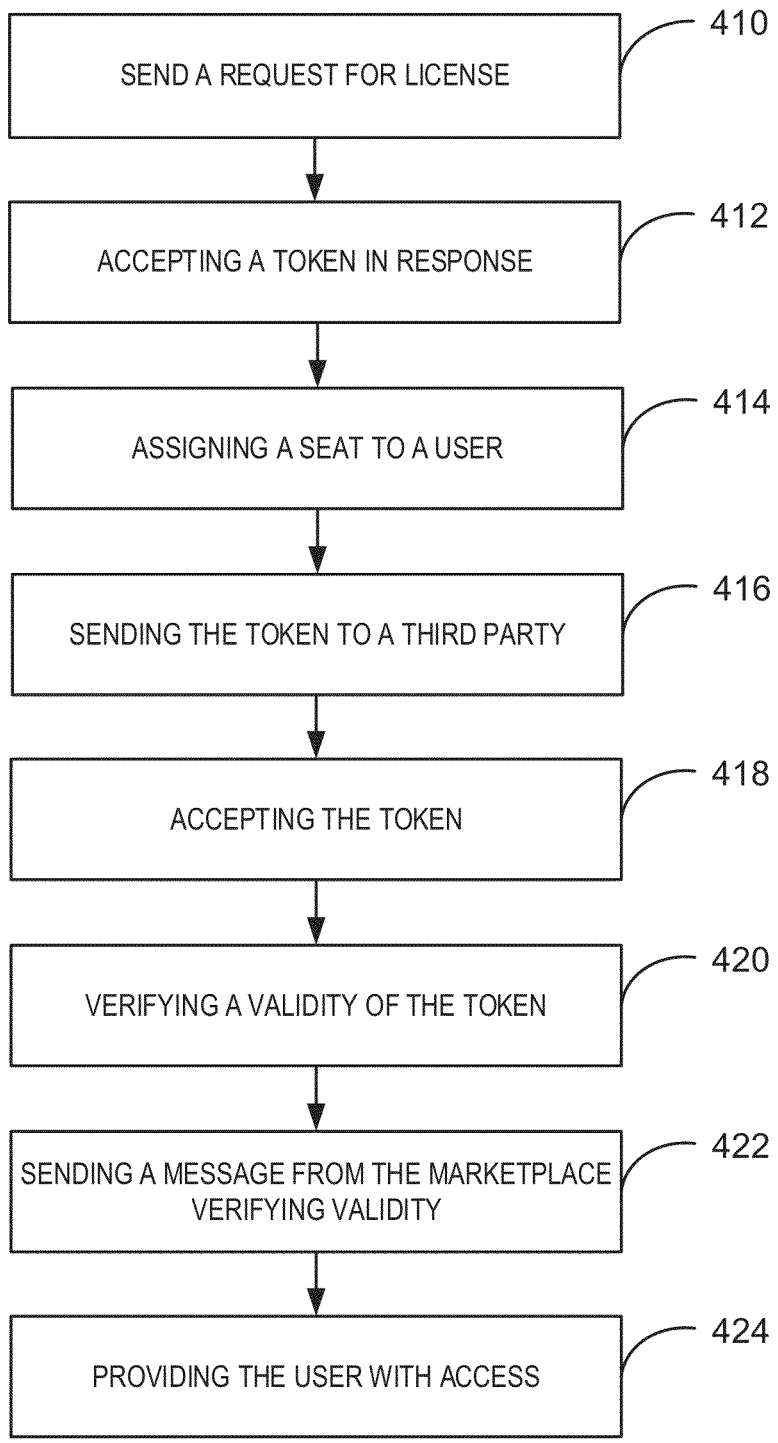
FIG. 4A is a process flow diagram showing a method for obtaining a license and sharing the license with an unlicensed user.

FIG. 4A is a process flow diagram showing a method for obtaining a license and sharing the license with an unlicensed user. At block 410 a request is sent for the license for the document template from the computing device to the marketplace service in response to an input by a purchaser. At block 412 a token is accepted, in response to the license request, from the marketplace service at the computing device via a client platform. At block 414 a seat is assigned to an unlicensed user. At block 416 the token is sent to a third party service when the user attempts to access the document template. At block 418 the token is accepted at the marketplace service provided from the third party service. At block 420 the validity of the token is verified at the marketplace service. At block 422 a message is sent from the marketplace service verifying the validity of the token to the third party service. At block 424 the user is provided with access to specific levels of service within the document template in response to receiving the message verifying the validity of the token from the third party service.

Figure 4B:
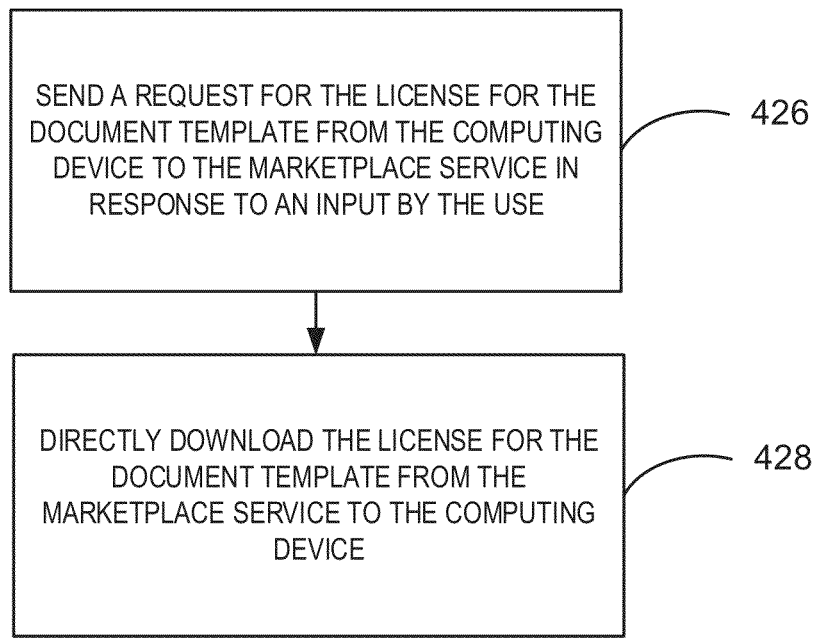
FIG. 4B is a process flow diagram showing a method for obtaining a method for obtaining a license for a document template from a marketplace service.

FIG. 4B is a process flow diagram showing a method for obtaining a method for obtaining a license for a document template from a marketplace service. At block 426 a request is sent for the license for the document template from the computing device to the marketplace service in response to an input by the user. At block 428 the license is directly downloaded for the document template from the marketplace service to the computing device.

Figure 5:
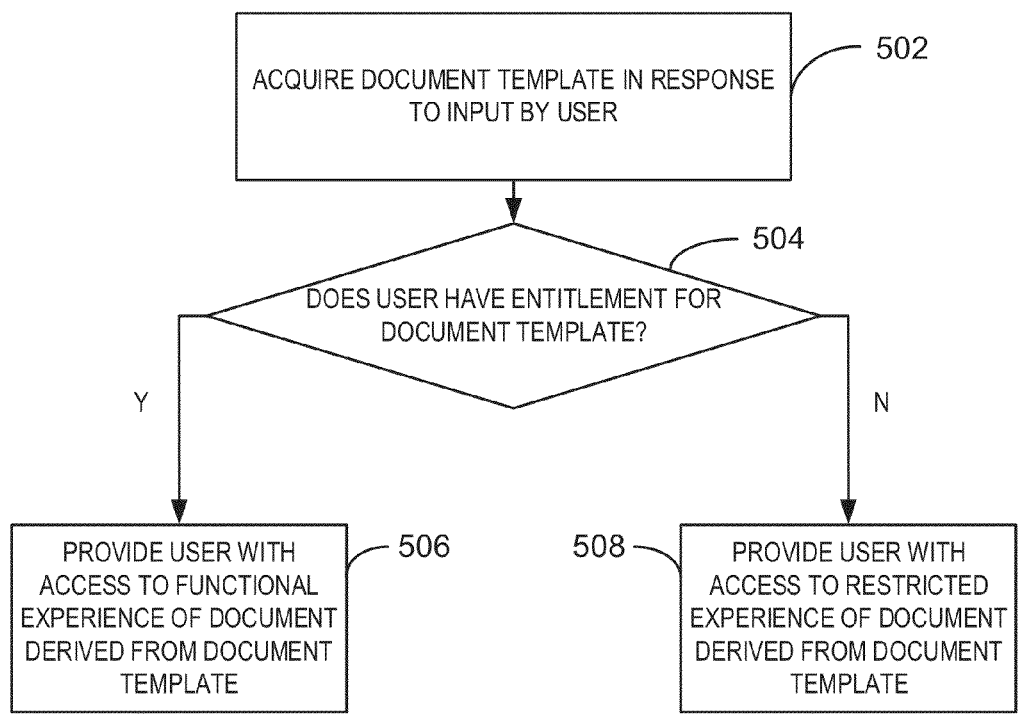
FIG. 5 is a process flow diagram showing a method for document template licensing enforcement.

FIG. 5 is a process flow diagram showing a method 500 for document template licensing enforcement. The method begins at block 502 with the acquirement of a document template by a computing device in response to an input by a user. As discussed above with respect to FIG. 4, the document template may be downloaded from a marketplace service or any of a number of third party services. In addition, the document template may be obtained from local storage media that resides within the computing device, or from external storage media that is communicably coupled to the computing device.

At block 504, it may be determined whether the user has an entitlement for the document template. The entitlement for the document template may also include one or more entitlements for the specific web add-ins that are contained within the document template. In some embodiments, such a determination may be made using the system 200 for document template licensing authentication described with respect to FIG. 2. For example, once the token is accepted from the marketplace service at the computing device, the client platform may send the token to a third party service when the user attempts to access the document template. The marketplace service may accept the token from the third party service, verify the validity of the token, and send a message verifying the validity of the token to the third party service. If the validity of the token is verified, the user may be provided with entitlement to services or higher-fidelity resources for the document template, such as the functional experience of the document template discussed below with respect to block

506. If the validity of the token is denied, the user may be restricted to an experience with the document template including limited levels of service, as discussed below with respect to block 508.

At block 506, the user may be provided with access to a functional, or rich, experience of the document derived from the document template. According to this embodiment, the user may be referred to as a "licensed user." The experience may provide a level of functionality and a level of quality that are in accordance with the conditions set forth in the license that was obtained by the licensed user, as discussed above with respect to FIG. 4. In addition, the licensed user may be allowed to share a license-restricted document with unlicensed users.

At block 508, the user may be provided with a restricted experience of the document derived from the document template. According to this embodiment, the user may be referred to as an "unlicensed user." In some embodiments, this may be accomplished through an input by a licensed user, which may cause the license-restricted document to be sent to the unlicensed user via email, for example. Further, in some embodiments, the unlicensed user may also be prompted to purchase the entitlement for the document template, or for the web add-ins present in a document that was once derived from the document template.

FIG. 5 is not intended to indicate that the steps of the method 500 are to be executed in any particular order, or that all of the steps of the method 500 are to be included in every case. Further, any number of additional steps not shown in FIG. 5 may be included within the method 500, depending on the specific application. For example, in some embodiments, the entitlement for the document template includes entitlements to specific web add-ins that are located within, or bound to, the document template, as discussed above. Thus, the functionality and quality of the document template may be affected by whether or not the user has an entitlement for each web add-in.

Further, it is to be noted that the document templates utilized according to the embodiments disclosed herein may be created by template providers in deliberately different ways, depending on the desired application. For example, if the value of a document template is in the freshness of the data, a textual chunk of the document template may be programmatically bound, i.e., connected, to a web add-in. In this case, a reference to a web add-in located within the marketplace service is inserted into the document template, and the metadata within that reference connects the data to the web add-in. For example, if a cell in a spreadsheet is used to provide the dollar to euro exchange rate, then the template provider may provide a reference to a currency exchange conversion web add-in located within the marketplace service, and may tie the value of the cell to the web add-in. Therefore, in the case of an unlicensed user, the cell may have a snapshot value of the dollar to euro exchange rate that has not been updated.

In addition, if the value of a document template is in the easy insertion of a customized feed of data, the content may be programmatically bound, i.e., connected, to a web add-in. In this case, a reference to a web add-in within the marketplace service is inserted into the document template, and the metadata within that reference connects the data to the web add-in. For example, rather than include a static list of tasks in a spreadsheet, a specific column could include a sample list of tasks. The column could be connected to a personalized task list web add-in, and the value of the column could be tied to the web add-in. Additional metadata can be provided and saved as metadata within the document template to customize the list. In some embodiments, this might allow for the retrieval of a personalized task list associated with a certain user, or it could enable the retrieval of a particular premium list. However, in the case of an unlicensed user, the column may contain an example value of the task list, not the customized task list.

Further, if the value of a document is in the quality of the imagery, video, or sound of the document template, the DOCX document may not include the original media file, e.g., the JPG file, but, instead, may include a reference to a web add-in with particular dimensions. In this case, a reference to a web add-in within the marketplace service is inserted into the document template, and metadata is injected that determines which piece of media should be rendered. For example, rather than including a high quality image of an animal, the template may include a reference to the web add-in, a piece of metadata that the web add-in used as input, and metadata describing the visual presentation of the web add-in's output. In addition, in the case of an unlicensed user, the document template, when saved, may contain a less valuable copy of the same animal image. For example, the image may be watermarked or have low resolution. It is to be understood that similar techniques can be applied to video or sound media, among others.

In various embodiments, the document template utilized according to embodiments disclosed herein is a graphical document template. For example, the document template may include web add-in-connected images containing a rich set of text, fonts, font effects, colors, imagery, and smart art, among others. In this case, when a licensed user opens the document template, the web add-in transforms this image into an editable document fragment. This document fragment supports pasting, but blocks copying. In addition, this fragment may or may not contain further web add-ins within it. When the user is done editing the document fragment, the document fragment is assigned a unique identifier and is saved online in a database. Further, upon saving the file itself, the application also transforms this document fragment back into a new image containing a high-resolution image of the document fragment. This allows template providers to create valuable, graphical sections within document templates, while allowing only licensed users to be able to fully edit those sections. Recipients of such document templates who have not paid, i.e., unlicensed users, may still be allowed to add comments, print, or make edits outside of these sections, and the licensed user may be able to edit the sections at any time.

Figure 6:
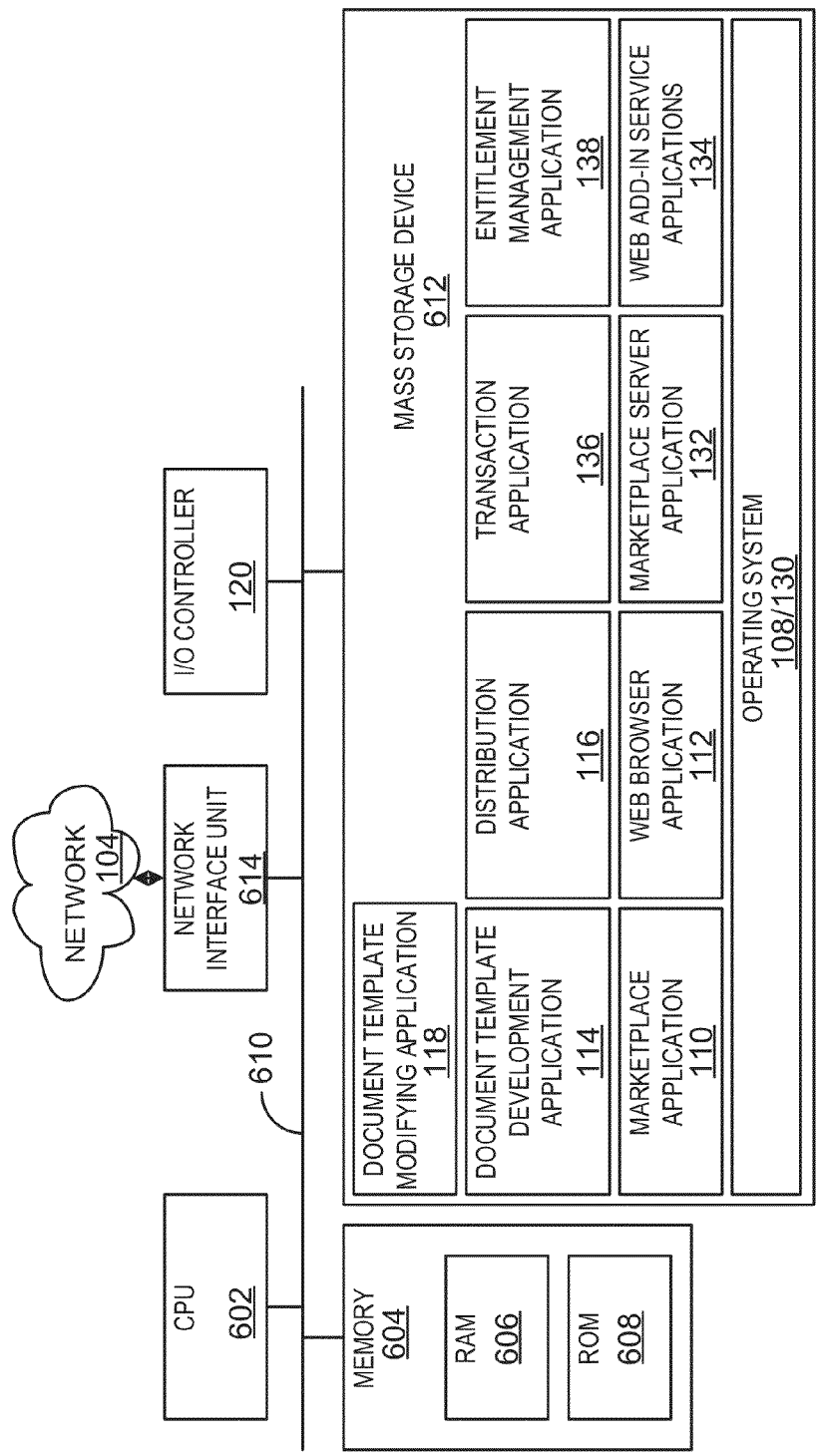
FIG. 6 is a block diagram of a computer architecture for a device capable of executing the software components described herein for document template licensing.

FIG. 6 is a block diagram of a computer architecture 600 for a device capable of executing the software components described herein for document template licensing. Like numbered items are as described with respect to FIG. 1. In various embodiments, the computer architecture 600 includes a server computer, mobile phone, a PDA, a smart phone, a desktop computer, a netbook computer, a tablet computer, or a laptop computer, among others. The computer architecture 600 may be utilized to execute any aspects of the software components presented herein.

In some embodiments, the user device A 102A, the user device 102B, the user device 102N, and the marketplace service server 106 are configured in accordance with the computer architecture 600. As such, software components of the user device A 102A and the marketplace service server 106 are shown together within the computer architecture 600 for ease of illustration. It should be understood, however, that these software components may be and are likely to be implemented in separate computers, such as in a client/server configuration, or as standalone software components executing on one or both of the user device A 102A and the marketplace service server 106. The user device 102B and the user device 102N may also include similar software components. It also should be understood that, although the data stores 122, 124, 126, 128, 140, 142, 144, and 146 described above with reference to FIG. 1 are not illustrated, one or more of the data stores 122, 124, 126, 128, 140, 142, 144, and 146 may also be included in the computer architecture 600, or the computer architecture 600 may be in communication with one or more of the data stores 122, 124, 126, 128, 140, 142, 144, and 146.

The computer architecture 600 may include a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing the operating system 108 and the server operating system 130, and one or more application programs including, but not limited to, the marketplace application 110, the web browser application 112, the document template development application 114, the distribution application 116, the document template modifying application 118, the marketplace server application 132, the web add-in service applications 134, the transaction application 136, and the entitlement management application 138.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 600.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600.

According to various embodiments, the computer architecture 600 may operate in a networked environment using logical connections to remote computers through the network 104 or another network (not shown). The computer architecture 600 may connect to the network 104 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown). Similarly, the input/output controller 616 may provide output to a display screen, a printer, or other type of output device (not shown).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Further, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Figure 7:
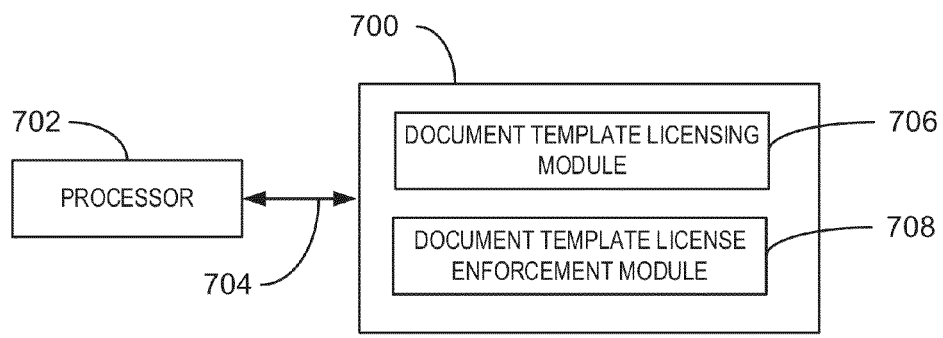
FIG. 7 is a block diagram showing a tangible, non-transitory, computer-readable medium that stores code adapted to perform a document template licensing procedure.

FIG. 7 is a block diagram showing a tangible, non-transitory, computer-readable medium 700 that stores code adapted to perform a document template licensing procedure. The tangible, non-transitory, computer-readable medium 700 may be accessed by a processor 702 over a computer bus 704. Furthermore, the tangible, non-transitory, computer-readable medium 700 may include code configured to direct the processor 702 to perform the steps of the current method.

The various software components discussed herein may be stored on the tangible, non-transitory, computer-readable medium 700, as indicated in FIG. 7. For example, a document template licensing module 706 may be configured to enable a user to purchase, or otherwise obtain, a license for a particular document template. In various embodiments, the license may be acquired according to the document template licensing authentication procedure discussed with respect to FIG. 2. Further, a document template license enforcement module 708 may be configured to determine whether a user is a licensed or an unlicensed user of the document template, and to adjust the quality and functionality of the document template, or a document derived from the document template, accordingly.

It is to be noted that the block diagram of FIG. 7 is not intended to indicate that the tangible, non-transitory, computer-readable medium 700 always includes both of the software components 706 and 708. In addition, the tangible, non-transitory, computer-readable medium 700 may include additional software components not shown in FIG. 7.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for licensing a document template, comprising:
    obtaining, at a computing device, a license for a document template comprising a style guide for a document from a marketplace service;
    downloading the document template to the computing device;
    providing a functionality of a document derived from the document template to a licensed user; and
    sharing a license-restricted document with an unlicensed user in response to an input from the licensed user, wherein the license-restricted document provides a reduced-functionality of the document derived from the document template to the unlicensed user; wherein sharing a license-restricted document with the unlicensed user comprises:
    assigning a seat to the unlicensed user;
    sending a token associated with the license to a third party service when the unlicensed user attempts to access the document template;
    accepting the token at the marketplace service provided from the third party service;
    verifying a validity of the token at the marketplace service;
    sending a message from the marketplace service verifying the validity of the token to the third party service.

2. The method of claim 1, wherein obtaining the license for the document template from the marketplace service comprises:
    sending a request for the license for the document template from the computing device to the marketplace service in response to an input by a purchaser;
    accepting a token, in response to the license request, from the marketplace service at the computing device via a client platform; and
    providing the user with access to specific levels of service within the document template in response to receiving the message verifying the validity of the token from the third party service.

3. The method of claim 2, wherein the licensed user comprises the purchaser or the user.

4. The method of claim 1, wherein obtaining the license for the document template from the marketplace service comprises:
    sending a request for the license for the document template from the computing device to the marketplace service in response to an input by the user; and
    directly downloading the license for the document template from the marketplace service to the computing device.

5. The method of claim 1, wherein providing the functionality of the document derived from the document template to the licensed user comprises providing the document derived from the document template for use in accordance with the license for the document template in response to determining that the licensed user has the license.

6. The method of claim 1, wherein sharing the license-restricted document with the unlicensed user comprises providing options for the unlicensed user to buy the document template or try the document template in response to determining that the unlicensed user does not have the license for the document template.

7. The method of claim 1, wherein providing the functionality of the document derived from the document template comprises loading the document derived from the document template within a target application on the computing device.

8. The method of claim 1, wherein at least a portion of the document template is bound to a web add-in.

9. The method of claim 1, wherein the license-restricted document comprises content with watermarks, sample content, content that has not been updated, or low quality content, or any combinations thereof.

10. The method of claim 1, wherein providing the functionality of the document derived from the document template to the licensed user comprises providing the licensed user with an ability to access high quality resources within the document, an ability to edit certain content within the document, or an ability to obtain fresh content via a third party service which has verified that the user has the license for the document template, or any combinations thereof.

11. The method of claim 10, wherein the license comprises a trial license or a paid license, and wherein the paid license comprises a premium paid license or a basic paid license.

* * * * *